US011479213B1

(12) United States Patent
Kentley-Klay

(10) Patent No.: US 11,479,213 B1
(45) Date of Patent: Oct. 25, 2022

(54) SENSOR OBSTRUCTION DETECTION AND MITIGATION

(71) Applicant: Zoox, Inc., Menlo Park, CA (US)

(72) Inventor: Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 404 days.

(21) Appl. No.: 15/837,953

(22) Filed: Dec. 11, 2017

(51) Int. Cl.
| | | |
|---|---|---|
| *B60S 1/46* | (2006.01) |
| *B60S 1/54* | (2006.01) |
| *B60S 1/56* | (2006.01) |
| *G01S 7/497* | (2006.01) |
| *G05D 1/02* | (2020.01) |
| *B60R 16/023* | (2006.01) |
| *G06K 9/62* | (2022.01) |
| *G06T 7/11* | (2017.01) |
| *G06T 7/246* | (2017.01) |
| *G06N 3/08* | (2006.01) |
| *B08B 3/02* | (2006.01) |
| *B08B 7/04* | (2006.01) |
| *G01S 17/931* | (2020.01) |
| *G06V 10/75* | (2022.01) |
| *B08B 7/00* | (2006.01) |
| *B08B 5/02* | (2006.01) |
| *B08B 1/00* | (2006.01) |

(52) U.S. Cl.
CPC ............... *B60S 1/56* (2013.01); *B08B 3/02* (2013.01); *B08B 7/04* (2013.01); *B60R 16/023* (2013.01); *G01S 7/497* (2013.01); *G01S 17/931* (2020.01); *G05D 1/024* (2013.01); *G05D 1/0246* (2013.01); *G06K 9/6256* (2013.01); *G06K 9/6267* (2013.01); *G06N 3/08* (2013.01); *G06T 7/11* (2017.01); *G06T 7/248* (2017.01); *G06V 10/751* (2022.01); *B08B 1/001* (2013.01); *B08B 5/02* (2013.01); *B08B 7/0071* (2013.01); *G01S 2007/4977* (2013.01); *G05D 1/027* (2013.01); *G05D 1/0278* (2013.01); *G06T 2207/30252* (2013.01)

(58) Field of Classification Search
CPC .......... G06N 20/00; G06T 2207/10016; G06T 2207/30248
See application file for complete search history.

(56) References Cited

U.S. PATENT DOCUMENTS 9,245,333 B1 * 1/2016 Beck .................. G06K 9/00791
9,467,687 B2 * 10/2016 Takemura ............ H04N 17/002
(Continued)

*Primary Examiner* — Peter D Nolan
*Assistant Examiner* — Ce Li Li
(74) *Attorney, Agent, or Firm* — Lee & Hayes, P.C.

(57) ABSTRACT

A system may be configured to detect an obstruction on sensor at least partially obstructing or distorting a portion of the field of view of the sensor. The system may also be configured to mitigate the effects of the obstruction or at least partially remove the obstruction from the sensor. The system may be configured to receive one or more signals from a sensor configured to generate signals indicative of an environment, which may include one or more objects, in which the sensor is present. The system may be configured to determine, for example, classify, based at least in part on the one or more signals, an obstruction or distortion on a surface of the sensor, and initiate a response, based at least in part on the determination, to mitigate effects of the obstruction and/or at least partially remove the obstruction.

20 Claims, 12 Drawing Sheets

(56) References Cited

U.S. PATENT DOCUMENTS

| | | | |
|---|---|---|---|
| 9,507,346 B1* | 11/2016 | Levinson | G05D 1/0291 |
| 10,095,934 B2* | 10/2018 | Takemura | G06K 9/00791 |
| 10,293,818 B2* | 5/2019 | Kroop | B60W 10/20 |
| 10,668,924 B2* | 6/2020 | Lee | G06K 9/6256 |
| 2007/0227718 A1* | 10/2007 | Hill | B60H 1/00785 |
| | | | 165/231 |
| 2011/0266375 A1* | 11/2011 | Ono | B60S 1/0848 |
| | | | 239/589 |
| 2014/0232869 A1* | 8/2014 | May | H04N 7/18 |
| | | | 348/148 |
| 2014/0270379 A1* | 9/2014 | Snider | B60S 1/56 |
| | | | 382/104 |
| 2015/0090291 A1* | 4/2015 | Na | B60S 1/56 |
| | | | 134/6 |
| 2015/0172582 A1* | 6/2015 | Kiyohara | G06K 9/00791 |
| | | | 348/322 |
| 2015/0334385 A1* | 11/2015 | Takemura | H04N 17/002 |
| | | | 348/175 |
| 2016/0176384 A1* | 6/2016 | Dissette | G01S 7/4004 |
| | | | 134/34 |
| 2017/0185850 A1* | 6/2017 | Hsu | B60W 50/14 |
| 2017/0185868 A1* | 6/2017 | Wang | G06K 9/6262 |
| 2017/0192423 A1* | 7/2017 | Rust | G05D 1/0077 |
| 2018/0009418 A1* | 1/2018 | Newman | B08B 3/02 |
| 2018/0096474 A1* | 4/2018 | Guerreiro | G06T 7/248 |
| 2018/0143298 A1* | 5/2018 | Newman | G01C 21/3492 |
| 2018/0210443 A1* | 7/2018 | Matsuzaki | G05D 1/0212 |
| 2019/0009752 A1* | 1/2019 | Rice | B60S 1/56 |
| 2019/0039575 A1* | 2/2019 | Hansen | G02B 27/0006 |
| 2019/0049948 A1* | 2/2019 | Patel | G05D 1/0214 |
| 2019/0106085 A1* | 4/2019 | Bacchus | B60S 1/46 |
| 2019/0188602 A1* | 6/2019 | Kwant | G06F 16/29 |
| 2019/0227553 A1* | 7/2019 | Kentley-Klay | B60L 15/20 |
| 2019/0293434 A1* | 9/2019 | Wiz | G01S 17/931 |

\* cited by examiner

SENSOR OBSTRUCTION DETECTION AND MITIGATION

BACKGROUND

Sensors may be used to generate sensor data indicative of objects in an environment. However, the effectiveness of the sensor may be compromised if the operating view of the sensor is partially or completely obstructed by an obstruction, such as, for example, dirt, bird droppings, bugs, lens scratches, or moisture (e.g., rain, snow, ice, condensation, etc.). Such obstructions may block a portion of the field of view of the sensor and/or generate sensor data that provides an inaccurate representation of one or more objects present in the environment in which the sensor is located. This situation may be particularly problematic when, for example, the sensor is used to provide sensor data for autonomous operation of a machine without the presence or assistance of an operator that might be able to detect and/or remove the obstruction from the sensor. For example, an autonomous vehicle operating without an operator relies at least in part on data generated by sensors for proper operation. If one or more of the sensors has an obstruction that affects the data generated by the sensor, the autonomous vehicle may take actions based on inaccurate information related to the environment through which it is travelling, such that, for example, the autonomous vehicle is unable to detect or identify objects, or locate the positions and/or trajectories of objects in the environment. This may hinder operation of such vehicles.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
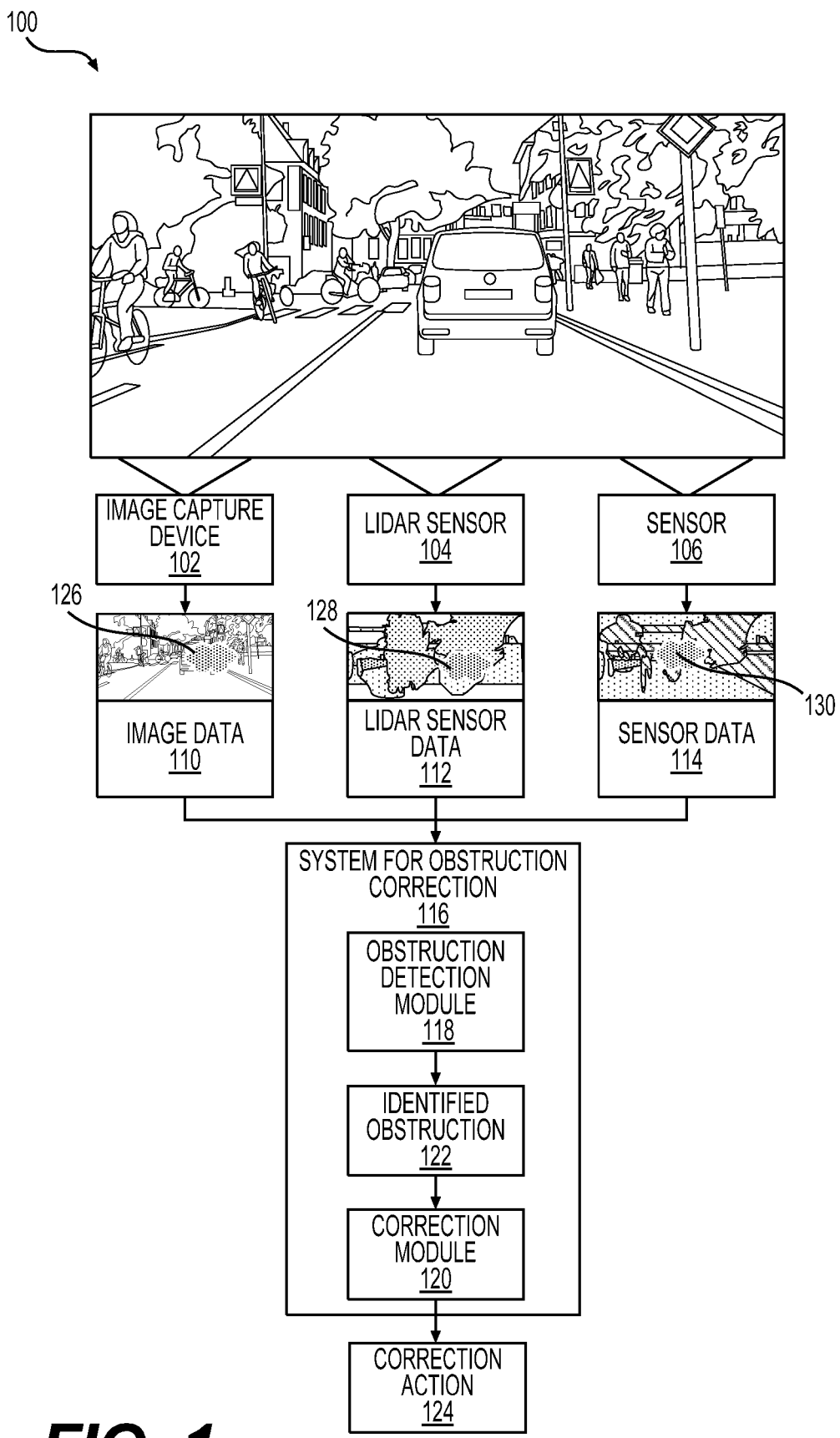
FIG. 1 is a pictorial flow diagram of an example process for detecting and removing obstructions from example sensors configured to generate signals indicative of an environment in which the sensors are present.

This disclosure is generally directed to methods, apparatuses, and systems for detecting and/or mitigating the effects of obstructions, such as, for example, dirt, bird droppings, bugs, lens scratches, or moisture (e.g., rain, snow, ice, condensation, etc.) on sensors configured to capture data representative of an environment (e.g., objects, such as cars, pedestrians, trees, buildings, etc., as well as background, such as road surfaces, sky, etc.). For example, a system may use different ways to determine the presence of an obstruction at least partially obstructing a field of view of the sensor based at least in part on, for example, a signal received from the sensor. Based at least in part on the determination, the system may initiate a response to mitigate effects of the obstruction or at least partially remove the obstruction from the sensor. As a result, the sensor data received from the sensor may be more useful for many applications, such as, for example, operation of an autonomous machine such as an autonomous vehicle. The techniques described herein may additionally or alternatively be applied in contexts other than autonomous machines.

This disclosure is generally directed to a system configured to receive one or more signals from a sensor indicative of an environment in which the sensor is present. The sensor may be an image capture device, such as, for example, one or more cameras (e.g., RGB-cameras, monochrome cameras, intensity (grey scale) cameras, infrared cameras, ultraviolet cameras, depth cameras, stereo cameras, and the like), a light detection and ranging (LIDAR) sensor, a radio detection and ranging (RADAR) sensor, one or more ultrasonic transducers, such as a sound navigation and ranging (SONAR) sensor, or another known sensor type. The system may also be configured to determine, based at least in part on the one or more signals, a presence of an obstruction on a surface of the sensor, and initiate a response, based at least in part on the determination, to one or more of mitigate effects of the obstruction or at least partially remove the obstruction from the sensor. For example, the obstruction may partially or completely obstruct a field of view of the sensor. Such obstructions may include, for example, dirt, bird droppings, bugs, lens scratches, or moisture (e.g., rain, snow, ice, condensation, etc.), which may be an interior surface or an exterior surface of the sensor. The obstruction may be transparent (e.g., a water drop), translucent, or opaque, or a combination thereof.

In some examples, determining the presence of the obstruction on the surface of the sensor may include comparing the one or more signals received from the sensor to one or more localization signals received from a localization system. For example, the machine (e.g., a vehicle) associated with the sensor (e.g., communicatively coupled to the sensor) may include a localization system configured to determine one or more of a position or orientation of the machine based at least in part on one or more sensors coupled to the machine. The one or more sensors may include one or more of a global positioning system, one or more inertial measurement units (IMUs), one or more wheel encoders, one or more light detection and ranging (LIDAR) sensors, or one or more image capture devices, such as a camera. Other types of sensors are contemplated. The system may be configured to compare the one or more signals received from the sensor with one or more localization signals received from the localization system, and to determine whether the sensor is detecting objects that are represented by the one or more localization signals received from the localization system. Based at least in part on any differences (e.g., differences greater than a threshold magnitude), the system may determine the presence of the obstruction on the surface of the sensor, for example, that is preventing the sensor from sensing an object represented by the one or more localization signals. In some examples, this detection of an obstruction may be confirmed or discounted, for example, according to other methods described herein.

In some examples, the sensor may include a first sensor configured to generate one or more first signals indicative of one or more objects detectible in an environment in which the first sensor is present, determining the presence of the obstruction on the surface of the first sensor may include receiving one or more second signals from a second sensor indicative of one or more objects detectible in the environment, and comparing the one or more second signals to the one or more first signals to determine a difference between objects detected by the first sensor and objects detected by the second sensor. For example, the second sensor may detect an object that is not detected by the first sensor, which may be an indication that something is preventing the first sensor from detecting the object, which in turn, may be an indication that at least a portion of the field of view of the first sensor is obstructed by an obstruction that may be on a surface of the first sensor at a position that corresponds, for example, to the object not detected by the first sensor. In some examples, this detection of an obstruction may be confirmed or discounted, for example, according to other methods described herein.

In some examples, the sensor may be a light detection and ranging (LIDAR) sensor, and determining the presence of the obstruction on the surface of the sensor may include, for example, receiving a first signal from a light sensor of the LIDAR sensor indicating detection of reflected light from an object stationary relative to the LIDAR sensor, and comparing the first signal from the light sensor to second signals received from neighboring light sensors of the LIDAR sensor. In such examples, determining the presence of an obstruction may include determining that the signal from the first light sensor is inconsistent with the second signals received from the neighboring light sensors. For example, the first signal may be indicative of an object that is stationary, and the second signals may be indicative of detection of an object that is moving (e.g., and the distance to the detected non-moving object is much shorter than the distance to the detected moving object (or indeterminate)), which may be an indication that the non-moving object is an obstruction on the sensor. In some examples, this detection of an obstruction may be confirmed or discounted, for example, according to other methods described herein.

In some examples, the sensor may include an image capture device, and determining the presence of the obstruction on the surface of the sensor may include receiving signals from the image capture device corresponding a sequence of images indicative of features present in the environment, and tracking features through the sequence of images. The image capture device may include, for example, one or more cameras (e.g., RGB-cameras, monochrome cameras, intensity (grey scale) cameras, infrared cameras, ultraviolet cameras, depth cameras, stereo cameras, and the like). In some such examples, determining the presence of an obstruction may include identifying the obstruction by identifying a feature in the sequence of images that fails to move in a manner consistent with other features. For example, if a relatively large portion of the features moves through and out of the image sequence in a consistent manner (e.g., because the sensor is moving through the environment), and another feature does not move relative to the sequence of images, it may be an indication that the non-moving feature is an obstruction on the sensor rather than a feature in the environment. In some examples, this detection of an obstruction may be confirmed or discounted, for example, according to other methods described herein.

In some examples, the one or more signals may include a plurality of signals indicative of a scene in the environment, and determining the presence of the obstruction on the surface of the sensor may include segmenting the scene, and identifying at least one segment in the scene that is stationary relative to the sensor in a manner inconsistent with other segments in the scene. For example, the segmentation may be performed by a machine learning network (e.g., a convolutional neural network (CNN)), and the machine learning network may segment and/or categorize all objects detected in a scene, except for an obstruction. Segmentation (e.g., image segmentation) may be used to partition data representative of an environment into different segments to provide a more meaningful representation of the environment. For example, an image may be segmented so as to uniquely identify objects within the image. Image segmentation may be used in a number of different applications. For example, a segmented image associated with a scene in an environment may contain a representation of one or more objects located in the environment. The presence and/or locations of the objects contained in the segmented image may, in turn, be used for obstacle avoidance, object detection and tracking, or the like, for example, in systems using some aspects of machine vision. For example, as explained herein, segmented sensor data may be used by a perception system of an autonomous vehicle to generate vehicle trajectories for operating the autonomous vehicle through the environment. In some examples, this form of detection of an obstruction may be confirmed or discounted, for example, according to other methods described herein.

In some examples, the system may be configured to activate an actuator configured to clear obstructions from the surface of the sensor. In some such examples, determining the presence of the obstruction on the surface of the sensor may include determining that following activation of the actuator, the one or more signals from the sensor are indicative of a reduction in size or elimination of an apparent object detected by the sensor. In such instances, the apparent object that has been reduced in size or eliminated following activation of the actuator may be an obstruction on the surface of the sensor instead of an object in the environment. In some examples, this detection of an obstruction may be confirmed or discounted, for example, according to other methods described herein.

Some examples of the system may be further configured to activate a machine learning network trained to identify an obstruction on the surface of the sensor. Machine learning generally refers to a broad class of such algorithms in which an output is generated based on learned parameters, which will be discussed in detail below. In such examples, the machine learning network may be trained to distinguish obstructions from objects in the environment, for example, via training data correlating one or more sensor signals with obstructions. In identifying obstructions, confidence levels may be associated with the identification of an obstruction, and the system, in some examples, may be configured to initiate the response when a confidence level associated with the identification exceeds a threshold confidence level. For example, a response such as one or more of those described herein may be used to mitigate or at least partially remove the obstruction from the sensor. In some examples, this detection of an obstruction may be confirmed or discounted, for example, according to other methods described herein.

In some examples, initiating the response may include either ignoring the signal from the sensor or ignoring portions of data associated with the obstruction. For example, if the system determines that an obstruction is present on the sensor, the one or more signals may be ignored by the system receiving the one or more signals. In some examples, only portions of the data determined to be affected by the obstruction may be ignored, while other portions of the data may be used for intended purposes.

In some examples, initiating the response may include at least partially removing the obstruction by activating an actuator configured to shrink or remove the obstruction. The actuator may include one or more of a water jet, an air jet, an ultrasonic cleaner, a wiper, a heater configured to reduce condensation, or an emitter of electromagnetic waves. Other types of actuators are contemplated.

In some examples, the system may be configured to be coupled to a vehicle, and initiating the response may include one or more of initiating communication with a teleoperations system configured to assist with operation of the vehicle, initiating notification of a vehicle service center regarding the obstruction, and/or reversing a direction of travel of the vehicle. For example, the vehicle may be configured to operate according to an assisted mode, wherein a teleoperations system located remotely from the vehicle may receive one or more signals from the vehicle relating to its operation (e.g., via a communications module and/or a related communications network). For example, the teleoperations system may be configured to detect an obstruction based on the one or more signals received from the vehicle, for example, via a teleoperator or and/or one or more of the methods described herein. The teleoperations system may be configured to send one or more signals to the vehicle causing the vehicle to initiate a response to mitigate or at least partially remove the obstruction, for example, as described herein. In some examples, the vehicle may be configured to notify a service center for servicing the vehicle of the obstruction. In some such examples, the vehicle may also travel to the service center, where the obstruction may be mitigated or at least partially removed. In some examples, the vehicle may be a bi-directional vehicle configured to operate generally with equal performance in either a first direction or a second opposite direction, for example, as described herein. In such examples, the vehicle may have at least similar sensors at both ends of the vehicle, and the system may be configured to cause the vehicle to operate in the opposite direction of travel if the system determines that an obstruction is affecting operation of one or more of its sensors facing toward or having a field of view facing the first direction of travel. This may serve to mitigate the effects of the obstruction until the obstruction can be reduced or at least partially removed from the sensor.

The techniques and systems described herein may be implemented in a number of ways. Example implementations are provided below with reference to the figures.

FIG. 1 is a pictorial flow diagram 100 of an example process for detecting and removing obstructions from example sensors configured to generate signals indicative of an environment in which the sensors are present. In the example shown, example sensors include an image capture device 102, a LIDAR sensor 104, and another sensor 106 that may be any type of sensor configured to generate signals indicative of an environment (which may include, for example, one or more objects), such as, for example, radio detection and ranging (RADAR) sensors and ultrasonic transducers, such as sound navigation and ranging (SONAR) sensors, as well as other sensors. For example, the image capture device 102, the LIDAR sensor 104, and the sensor 106 may be coupled to a vehicle travelling through the environment 108. For example, the vehicle may be an autonomous vehicle, such as the example vehicle described herein with respect to FIG. 2. The image capture device 102 may be any type of image capture device configured to capture images representative of the environment, such as, for example, one or more cameras (e.g., RGB-cameras, monochrome cameras, intensity (grey scale) cameras, infrared cameras, ultraviolet cameras, depth cameras, stereo cameras, and the like), and the LIDAR sensor 104 may be any type of LIDAR sensor. Some examples may include only a single type of sensor or any combination of different types of sensors configured to generate data representative of the environment. Further, though depicted as single sensors for illustrative purposes, any number of image capture device(s) 102, LIDAR sensor(s) 104, or sensor(s) 106 are contemplated.

In the example shown in FIG. 1, the image capture device 102 is depicted as capturing image data 110 in the form of one or more signals corresponding to one or more images representative of the environment 108. In some examples, the image data 110 may correspond to more than one image captured by the image capture device 102, and the image data 110 may be fused to generate a more complete or accurate representation of the environment 108.

The example LIDAR sensor 104 shown in FIG. 1 is depicted as capturing LIDAR data 112 in the form of one or more signals representative of the environment 108. In some examples, the LIDAR data 112 may correspond to multiple sweeps of the LIDAR sensor 104 over time, and the LIDAR data 112 may be fused to generate a more complete or accurate representation of the environment 108. For example, the LIDAR sensor 104 may be configured such that the one or more lasers are mounted to spin (e.g., about a substantially vertical axis), thereby causing the lasers to sweep through, for example, 360 degrees, to capture LIDAR data 112 associated with the environment 108. For example, the LIDAR sensor 104 may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of the LIDAR sensor 104 may be represented as three-dimensional LIDAR data having coordinates (e.g., Cartesian, polar, etc.) corresponding to positions or distances captured by the LIDAR sensor 104. For example, the three-dimensional LIDAR data may include a three-dimensional map or point cloud, which may be represented as a plurality of vectors emanating from a light emitter and terminating at an object or surface. In some examples, converting operations may be used to convert the three-dimensional LIDAR data to multi-channel two-dimensional data. In some examples, the LIDAR data 112 may be automatically segmented, and the segmented LIDAR data may be used, for example, as input for determining trajectories for an autonomous vehicle.

The example sensor 106 shown in FIG. 1 may be configured to capture sensor data 114 in the form of one or more signals representative of the environment 108. In some examples, the sensor data 114 may be fused to generate a more complete or accurate representation of the environment 108.

In some examples, the image capture device 102, the LIDAR sensor 104, and/or the sensor 106 may capture different fields of view relative to the environment 108. In such examples, the image data 110, the LIDAR data 112, and/or the sensor data 114 may be aligned.

As shown in FIG. 1, the example process 100 may include communicating the image data 110, the LIDAR data 112, and/or the sensor data 114 to a system for obstruction correction 116, which may be configured to detect an obstruction partially or completely obstructing the field of view of the image capture device 102, the LIDAR sensor 104, and/or the sensor 106. In some examples, the system for obstruction correction 116 may also be configured to mitigate effects of the obstruction and/or at least partially remove the obstruction from the respective sensor. For example, the example system for obstruction correction 116 shown in FIG. 1 includes an obstruction detection module 118 configured to receive one or more signals from the image capture device 102, the LIDAR sensor 104, or the sensor 106 and determine, based at least in part on the one or more signals, the presence of an obstruction on a surface of one or more of the image capture device 102, the LIDAR sensor 104, or the sensor 106, for example, as described herein. Some examples of the system for obstruction correction 116 may include a correction module 120, and in some such examples, when the obstruction detection module 118 determines the presence of an obstruction, one or more signals indicative of the identified obstruction 122 may be communicated to the correction module 120, which may be configured to initiate a response, based at least in part on the one or more signals indicative of the identified obstruction 122, to mitigate the effects of the obstruction and/or at least partially remove the obstruction from the respective sensor. For example, as shown in FIG. 1, the correction module 120 may be configured to communicate a correction action 124 intended to mitigate the effects of the obstruction and/or at least partially remove the obstruction from the respective sensor.

For example, each of the image capture device 102, the LIDAR sensor 104, and the sensor 106 has a respective obstruction 126, 128, and 130, as schematically depicted in the image data 110, the LIDAR sensor data 112, and the sensor data 114 shown in FIG. 1. The image data 110, the LIDAR sensor data 112, and the sensor data 114 are communicated to the example system for obstruction correction 116, and the obstruction detection module 118 may use one or more of the example techniques described herein to determine that there is an obstruction on the surface of the image capture device 102, the LIDAR sensor 104, and the sensor 106. For the purpose of illustration, each of the image capture device 102, the LIDAR sensor 104, and sensor 106 shown in FIG. 1 have an obstruction, but it is contemplated that any number of such devices may have an obstruction (or obstructions). The identified obstruction 122 may be communicated to the correction module 120, which may in turn, communicate a corrective action 124 to mitigate the effects of the obstruction and/or at least partially remove the obstruction from the affected sensor(s).

Figure 2:
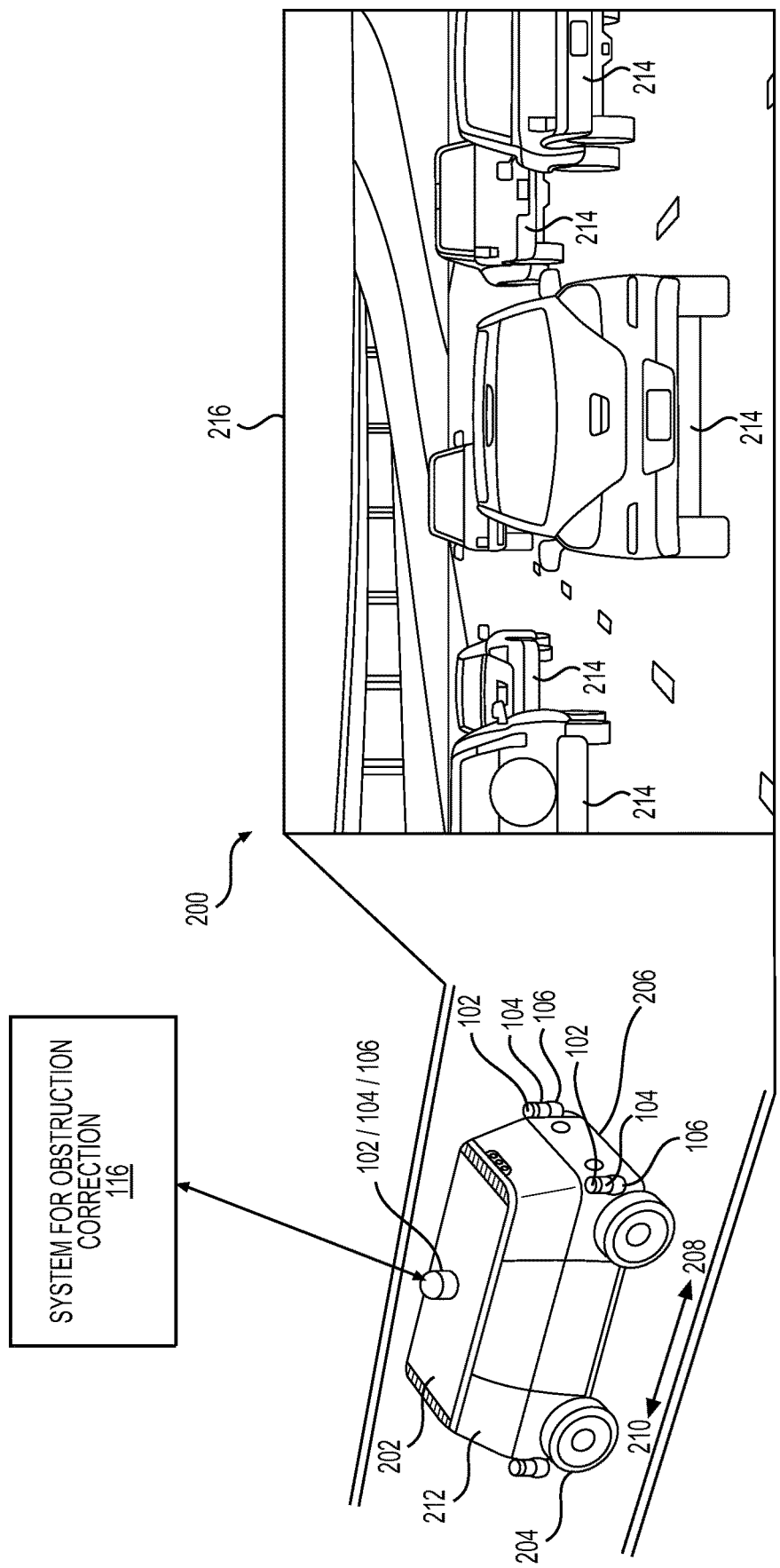
FIG. 2 is an example environment through which an example vehicle is travelling and capturing sensor data.

FIG. 2 shows an example environment 200 through which an example vehicle 202 is traveling. The example vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 202 may be any configuration of vehicle, such as, for example, a van, a sport utility vehicle, a cross-over vehicle, a truck, a bus, an agricultural vehicle, and a construction vehicle. The vehicle 202 may be powered by one or more internal combustion engines, one or more electric motors, hydrogen power, any combination thereof, and/or any other suitable power sources. Although the example vehicle 202 has four wheels 204, the systems and methods described herein may be incorporated into vehicles having fewer or a greater number of wheels, tires, and/or tracks. The example vehicle 202 may have four-wheel steering and may operate generally with equal performance characteristics in all directions, for example, such that a first end 206 of the vehicle 202 is the front end of the vehicle 202 when travelling in a first direction 208, and such that the first end 206 becomes the rear end of the vehicle 202 when traveling in the opposite, second direction 210, as shown in FIG. 2. Similarly, a second end 212 of the vehicle 202 is the front end of the vehicle 202 when travelling in the second direction 210, and such that the second end 212 becomes the rear end of the vehicle 202 when traveling in the opposite, first direction 208. These example characteristics may facilitate greater maneuverability, for example, in small spaces or crowded environments, such as parking lots and urban areas.

The vehicle 202 may travel through the environment 200, relying at least in part on sensor data indicative of objects in the environment 200 in order to determine trajectories of the vehicle 202. For example, as the vehicle 202 travels through the environment 200, one or more image capture devices 102, LIDAR sensors 104, and/or other types of sensors 106 capture data associated with detected objects (e.g., vehicles 214 shown in FIG. 2, and/or pedestrians, buildings, barriers, etc.). The data captured may be used, for example, as input for determining trajectories for the vehicle 202. As schematically depicted in FIG. 2, the vehicle 202 may include a system for obstruction correction 116 configured detect an obstruction partially or completely obstructing the field of view of one or more of the sensors (e.g., the image capture device(s) 102, the LIDAR sensor(s) 104, and/or the other types of sensor(s) 106), and in some examples, mitigate effects of the obstruction and/or at least partially remove the obstruction from the affected sensor.

Figure 3:
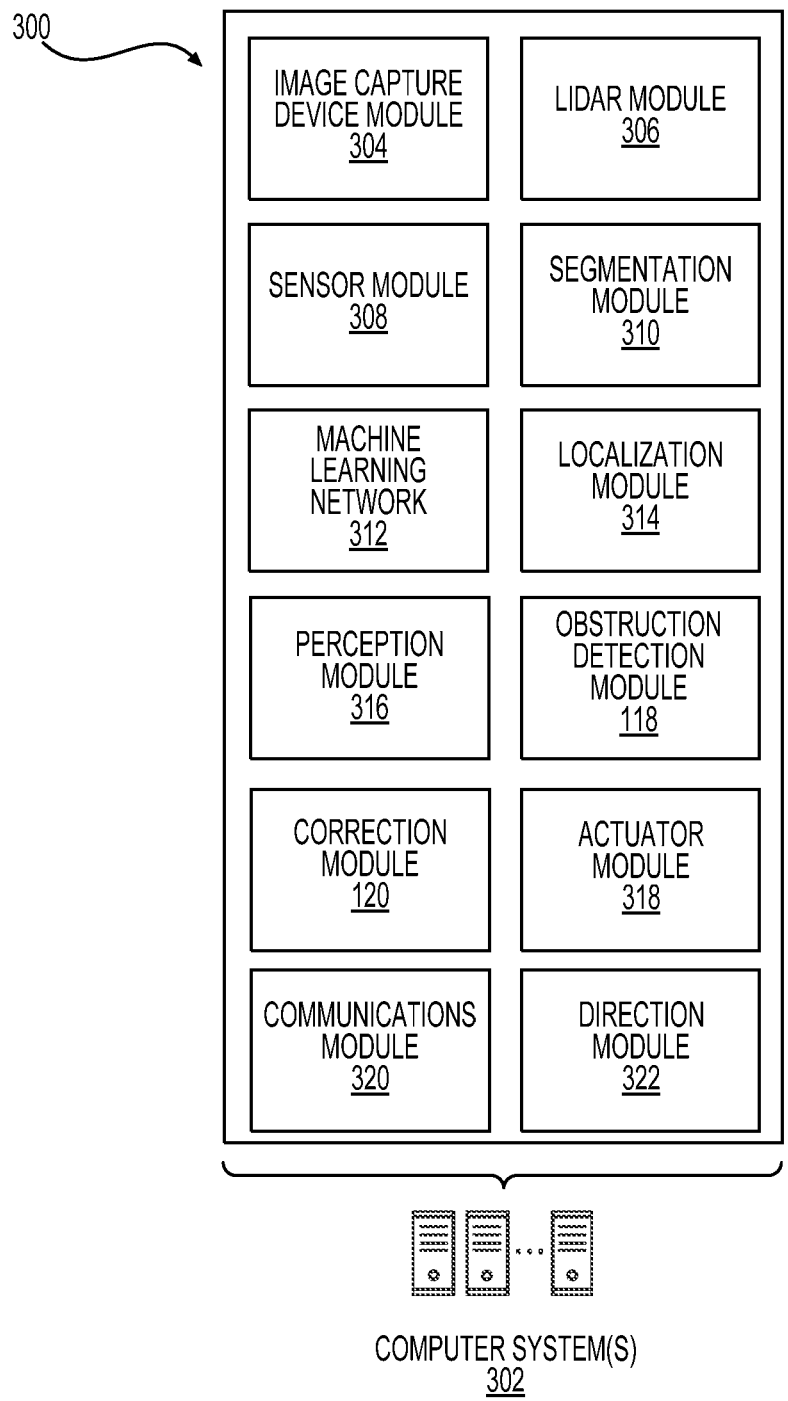
FIG. 3 is an example architecture for detecting and removing obstructions from a surface of a sensor.

FIG. 3 shows an example architecture 300 for implementing one or more of the example processes described herein. For example, the architecture 300 may include one or more computer systems 302 including various hardware and/or software to implement aspects of the systems, methods, and apparatuses described herein. For example, the computer system(s) 302 may include one or more of an image capture module 304, a LIDAR module 306, a sensor module 308, a segmentation module 310, a machine learning network 312, a localization module 314, and a perception module 316 (e.g., a perception system).

In some examples, the computer system(s) 302 may be embodied in an autonomous vehicle, such as, for example, the example vehicle 202 shown in FIG. 2. In some examples, the computer system(s) 302 may provide perception and planning functionality for the autonomous vehicle. In general, the computer system(s) 302 may include LIDAR perception, vision (camera) perception, segmentation and classification, tracking and fusion, and prediction/planning.

The computer system(s) 302 may include any number or type of processors and/or sensors suitable for use in an autonomous vehicle, for example. For example, various sensors may include, but are not limited to, ultrasonic transducers, wheel encoders, microphones, inertial measurement unit(s) (IMU(s)), accelerometers, gyroscopes, magnetometers, temperature sensors, humidity sensors, light sensors, a global positioning system (GPS), an inertial navigation system (INS), etc.

The image capture device module 304 may include one or more image capture devices 102 configured to capture image data 110 for image segmentation and/or classification, for example, as described herein. The image capture device module 304 may include any number and/or type of image capture sensors. For example, the image capture module 304 may include image capture devices, such as any cameras (e.g., RGB-cameras, monochrome cameras, intensity (grey scale) cameras, infrared cameras, ultraviolet cameras, depth cameras, stereo cameras, and the like). As may understood in the context of this disclosure, the image capture device module 304 may capture image data 110 and may transmit datasets to the computer system(s) 302 for subsequent processing. For example, data from the image capture module 304 may be included as one or more channels of a multi-channel image.

The LIDAR module 306 may include one or more LIDAR sensors 104 configured to capture LIDAR data 112 for use, as described herein. For example, the LIDAR module 306 may be configured to combine or synthesize LIDAR data from a plurality of LIDAR sensors to generate a meta spin of LIDAR data, which may be LIDAR data generated by multiple LIDAR sensors. In the case of a meta spin of LIDAR data, the LIDAR module 306 may be configured to determine a virtual origin (e.g., common origin) of the meta spin data. In some examples, the LIDAR module 306 may be configured to determine a range between a LIDAR sensor and a point of an object or surface, and in some examples, the LIDAR module 306 may be configured to determine a surface normal vector for each point captured and/or sensed by the LIDAR module 306. As a non-limiting example, such a surface normal determination may be performed by calculating the normal of the cross product of vectors indicating directions from the point to two of the point's nearest neighboring points. As may be understood in the context of this disclosure, the LIDAR module 306 may capture data and may transmit datasets to the computer system(s) 302 for subsequent processing.

The sensor module 308 may include any additional sensors 106 configured to capture sensor data 114 for use, as described herein. The sensors 106 may be any sensors of a type different than the image capture device(s) 102 and the LIDAR sensor(s) 104. Such sensors may include, but are not limited to, RADAR sensors and ultrasonic transducers (e.g., SONAR sensors).

In some examples, the image capture device module 304, the LIDAR module 306, and/or the sensor module 308 may provide one or more datasets to the computer system(s) 302 for combining and/or synthesizing the data. For example, the computer system(s) 302 may be configured to receive and store datasets as described herein. In some examples, the computer system(s) 302 may be configured to annotate the stored data, which may include detecting, identifying, classifying, segmenting, labeling, etc., the data.

In some examples, the computer system(s) 302 may also include simulated data that has been generated by a computer simulation algorithm, for use in part in testing. In some examples, the simulated data may include any type of simulated data, such as image data, sensor data (e.g., LIDAR data, RADAR data, and/or SONAR data), GPS data, etc. In some examples, the computer system(s) 302 may be configured to modify, transform, and/or perform converting operations on the simulated data for verifying an operation and/or for training models executable by machine learning networks.

The example segmentation module 310 may be configured to perform segmentation on one or more two-dimensional images (including multi-channel images) obtained from the one or more image capture devices 102. For example, the segmentation module 310 may be configured to input the one or more multi-channel two dimensional images to one or more machine learning algorithms, though any other image segmentation algorithm is contemplated (e.g., K-means segmentation, EM segmentation, mean-shift clustering, and the like). For example, the segmentation module 310 may perform image segmentation to segment objects represented in the data for subsequent image classification. In some examples, hardware and/or software configured to perform segmentation operations on data may be considered to be a "segmenter." In some examples, the segmentation module 310 may be configured to operate on any number of channels associated with the two-dimensional images. For example, the segmentation module 310 may receive one or more channels as inputs including, but not limited to, range channels, x-axis channels, y-axis channels, z-axis channels, surface normal vector channels, reflectivity channels, time channels, etc.

In some examples, the segmentation module 310 may use a machine learning network 312 including one or more machine learning algorithms for performing segmentation. For example, the segmentation module 310 may utilize a convolutional neural network (CNN) trained to segment multi-channel two-dimensional data. In some examples, the segmentation module 310 may be configured to perform segmentation on LIDAR sensor data 112 obtained from the one or more LIDAR sensors 104, and/or sensor data 114 obtained from the one or more sensors 106.

The example localization module 314 may be configured to receive sensor data from the sensor module 308 including, for example, data from one or more of image capture devices, LIDAR sensors, RADAR sensors, SONAR sensors, global positioning system (GPS) data, wheel data, inertial measurement unit (IMU) data, and the like, and in some examples, map data, and route data. In some examples, localization module 314 may fuse at least at some of the sensor data and analyze the data by comparing the sensor data to map data to determine a local pose of the vehicle 202. In some examples, the localization module 314 may generate or update the pose in real-time or near real-time. According to some examples, data describing a local pose may include one or more of an x-coordinate, a y-coordinate, a z-coordinate (or any coordinates of any coordinate system, including polar or cylindrical coordinate systems, or the like), a yaw value, a roll value, a pitch value (e.g., an angle value), a rate (e.g., velocity), altitude, or the like.

In some examples, the perception module 316 may be configured to receive sensor data from one or more sources and the local pose data, and determine locations of external objects based on sensor data and other data. For example, the perception module 316 may be configured to detect and classify external objects, such as, for example, pedestrians, bicyclists, dogs, other vehicles, etc. Based at least in part on the classifications of the external objects, the external objects may be labeled as dynamic objects or static objects. For example, the perception engine 316 may be configured to label a tree as a static object, and may be configured to label a pedestrian as a dynamic object. Further data about external objects may be generated by tracking the external objects, and the object classification type may be used in some examples to predict or determine the likelihood that an external object may interfere with the vehicle 202 as it travels along a planned path. For example, an external object that is classified as a pedestrian may be associated with a maximum speed and/or an average speed. The perception module 316 and/or the segmentation module 310 may use the machine learning network 312, which may execute any one or more machine learning algorithms, such as, for example, neural networks, to perform classification operations.

A neural network is a biologically inspired algorithm, which passes input data through a series of connected layers to produce an output. One example of a neural network is the convolutional neural network (CNN). Each layer in a CNN may also include another CNN, or may include any number of layers. A neural network may utilize machine learning, which is a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, backpropagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, more than one type of machine learning network may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

The example architecture 300 shown in FIG. 3 also includes the obstruction detection module 118 and the correction module 120, for example, as previously described herein. In some examples, the architecture 300 may also include an actuator module 318 configured to receive one or more signals from the correction module 120 and initiate or cause an actuator to mitigate effects of a detected obstruction and/or at least partially remove an obstruction from a sensor affected by the obstruction, for example, as explained herein. In addition, the example architecture 300 may also include a communications module 320 configured to communicate with, for example, a teleoperations center and/or a vehicle service center via a communications network, for examples, as described herein.

In some examples, the architecture 300 may also include a direction module 322 configured to cause a vehicle, for example, a bi-directional vehicle such as the example vehicle 202, to reverse its direction of travel as described herein. For example, the vehicle may have a trajectory module configured to generate trajectories for the vehicle to follow, and the direction module 322 may be configured to communicate with, or be a part of, the trajectory module, which may, based at least in part on one or more signals received from the direction module 322, cause the vehicle to reverse its direction of travel and generate different trajectories based on the changed direction of travel. For example, a trajectory module may be configured to receive segmented and/or classified data to determine trajectories for operation of an autonomous vehicle, such as, for example, the example vehicle 202. In some such examples, the trajectory module may be configured to receive segmented image data, segmented sensor data, and/or related classification information identifying free space on a road for an autonomous vehicle to travel, and generate a trajectory for the autonomous vehicle to follow. In some examples, a trajectory module may receive as inputs the segmented and/or classified objects as discussed herein and may track objects to generate trajectories based at least in part on such objects.

Figure 4A:
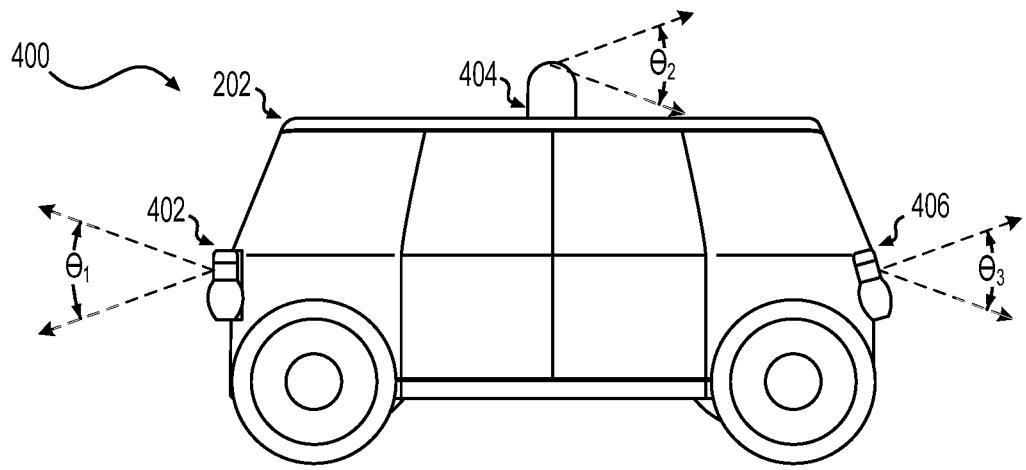
FIG. 4A depicts a side view of an example vehicle having multiple sensor types.

FIG. 4A is a side view 400 of an example vehicle 202 having multiple sensor assemblies mounted on, or carried by, the vehicle 202. In some examples, datasets from the multiple sensor assemblies may be combined or synthesized to form a meta spin (e.g., LIDAR data representing a plurality of LIDAR sensors) or can be combined or fused using sensor fusion techniques to improve accuracy or processing for segmentation, classification, prediction, planning, trajectory generation, etc.

As shown in the side view 400, the vehicle 202 may include any number of sensors in any combination or configuration. For example, the vehicle 202 includes at least sensors 402, 404, and 406. In some instances, the sensor 402 may include a RADAR sensor having a vertical field of view illustrated as $\theta_1$. The sensor 404 may include a LIDAR sensor mounted on a roof of the vehicle 202, the sensor 404 having a vertical field of view illustrated as $\theta_2$. In some instances, the sensor 406 may include a camera sensor having a vertical field of view $\theta_3$. Of course, the vehicle 202 may include any number and type of sensors, and is not limited to the examples provided in FIG. 4A.

Figure 4B:
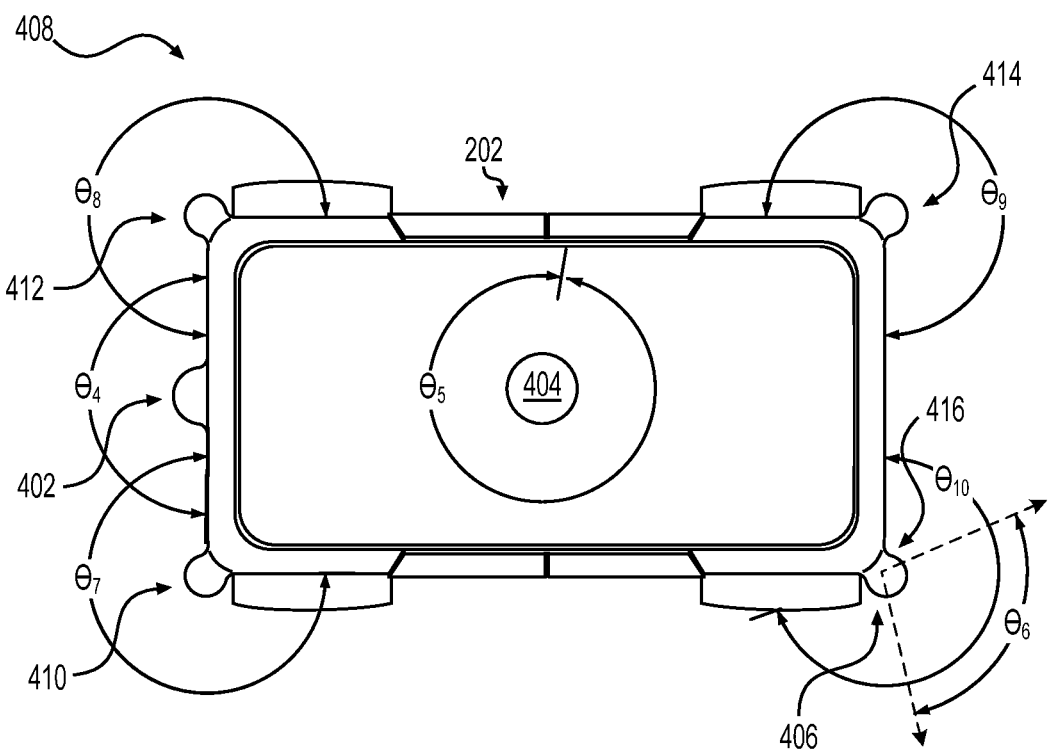
FIG. 4B depicts a top view of the example vehicle shown in FIG. 4A.

FIG. 4B depicts a top plan view 408 of the example vehicle 202 having multiple sensor assemblies mounted to the vehicle. For example, the sensors 402, 404, and 406 can be seen in FIG. 4B, as well as additional sensors 410, 412, 414, and 416. For example, the sensors 406 and 416 may be co-located or located proximate to one another, but may include different sensor types or modalities, having different fields of view. In some instances, the sensors 410, 412, 414, and 416 may include additional LIDAR sensors, RADAR sensors, and/or image capture devices. As may be understood in the context of this disclosure, the vehicle 202 may include any number and any type of sensors. As illustrated in FIG. 4B, the sensor 402 may include a horizontal field of view $\theta 4$, the sensor 404 may include a horizontal field of view $\theta 5$, the sensor 406 may include a horizontal field of view $\theta_6$, the sensor 410 may include a horizontal field of view $\theta_7$, the sensor 412 may include a horizontal field of view $\theta_8$, the sensor 414 may include a horizontal field of view $\theta_9$, and the sensor 416 may include a horizontal field of view $\theta_{10}$. As may be understood in the context of this disclosure, the mounting locations and fields of view may include any number of configurations.

Figure 5:
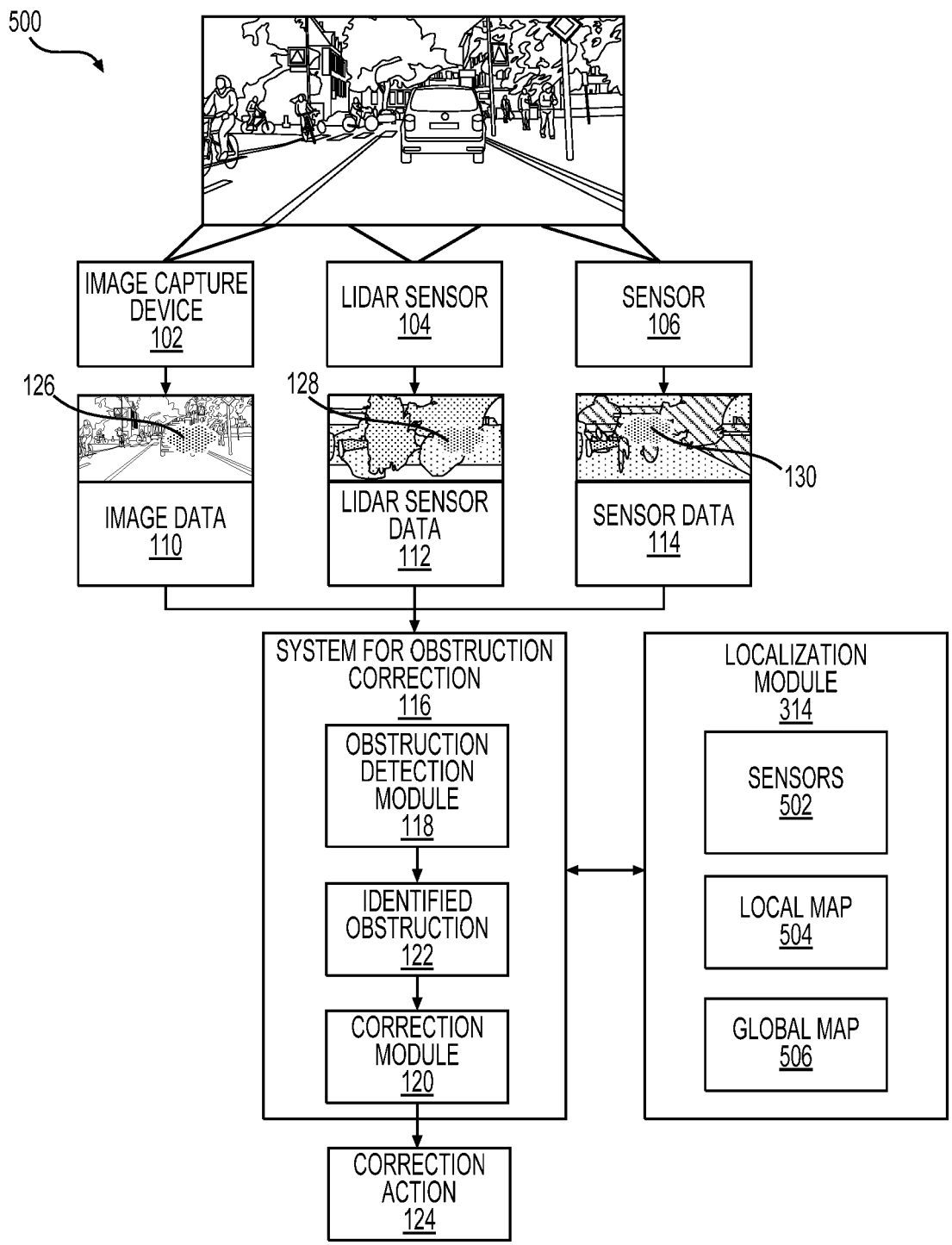
FIG. 5 is an example pictorial flow diagram of an example process for detecting an obstruction on a surface of a sensor using an example localization module.

FIG. 5 is an example pictorial flow diagram of an example process 500 for detecting and removing an obstruction from a surface of a sensor using an example localization module. Similar to FIG. 1, sensors, which may include an image capture device 102, a LIDAR sensor 104, and/or another sensor 106, may be coupled to a vehicle travelling through the environment 108. The image capture device 102, LIDAR sensor 104, and sensor 106 capture image data 110, LIDAR sensor data 112, and sensor data 114, respectively, representative of the environment 108, and may communicate the data to the system for obstruction correction 116, which may be configured to detect an obstruction partially or completely obstructing the field of view of one or more of the image capture device 102, the LIDAR sensor 104, and/or the sensor 106. In the example shown, the system for obstruction correction 116 may include an obstruction detection module 118 configured to receive one or more signals from the image capture device 102, the LIDAR sensor 104, or the sensor 106 and determine, based at least in part on the one or more signals, the presence of an obstruction on a surface of one or more of the image capture device 102, the LIDAR sensor 104, or the sensor 106.

For example, as shown in FIG. 5, each of the image capture device 102, the LIDAR sensor 104, and the sensor 106 has a respective obstruction 126, 128, and 130, as schematically depicted in the image data 110, LIDAR sensor data 112, and the sensor data 114. The image data 110, the LIDAR sensor data 112, and the sensor data 114 are communicated to the example system for obstruction correction 116. In the example shown in FIG. 5, the system for obstruction correction 116 may receive one or more signals from a localization module 314. In some examples, the localization module 314 may include sensors 502 configured to generate signals indicative of one or more of the position or orientation of the vehicle, which may include image capture devices (e.g., image capture device 102), LIDAR sensors (e.g., LIDAR sensor 104), and other sensors (e.g., sensor 106) configured to supply sensor data for determining one or more of the position or orientation of the vehicle. In some examples, the sensors 502 may also include one or more accelerometers, one or more gyroscopes, one or more magnetometers, one or more inertial measurement units (IMUs), a global positioning system, etc. In some examples, the localization module 314 may also receive one or more signals indicative of a local map 504 and/or one or more signals indicative of a global map 506 to assist the localization module 314 with determining the pose of the vehicle.

In the example shown in FIG. 5, determining the presence of the obstruction on the surface of one or more of the sensors may include comparing the one or more signals received from one or more of the image capture device 102, the LIDAR sensor 104, and the sensor 106 to one or more localization signals received from a localization module 314. For example, as shown in FIG. 5, each of the image capture device 102, the LIDAR sensor 104, and the sensor 106 have respective obstructions 126, 128, and 130 on the surface thereof. In some examples, the obstruction detection module 118 may be configured to compare the one or more signals received from one or more of the image capture device 102, the LIDAR sensor 104, or the sensor 106 with one or more localization signals received from the localization module 314. Based at least in part on the comparison, the obstruction detection module 118 may be configured to determine whether the sensors are detecting objects that are represented by the one or more localization signals received from the localization module 314. Based at least in part on any differences (e.g., differences greater than a threshold magnitude), the obstruction detection module 118 may determine the presence of the obstruction on the surface of the affected sensor, for example, which is preventing the sensor from sensing an object represented by the one or more localization signals. In the example shown, each of the image capture device 102, the LIDAR sensor 104, and the sensor 106 have respective obstructions 126, 128, and 130, and a comparison of the image data 110, the LIDAR sensor data 112, and the sensor data 114 with the localization signals may result in identifying the differences between the objects and/or environment detected by the image capture device 102, the LIDAR sensor 104, and the sensor 106, and the objects represented by the localization signals. As a non-limiting example, the localization data may comprise information about the environment surrounding the vehicle, such as, but not limited to, a corresponding mesh. Such a mesh may be used to calculate expected depth values from the LIDAR sensor to the mesh which, in turn, may be compared to the measured values from the LIDAR sensor 104. Other techniques described herein may be used to confirm or discount that the obstruction determination is accurate.

Figure 6:
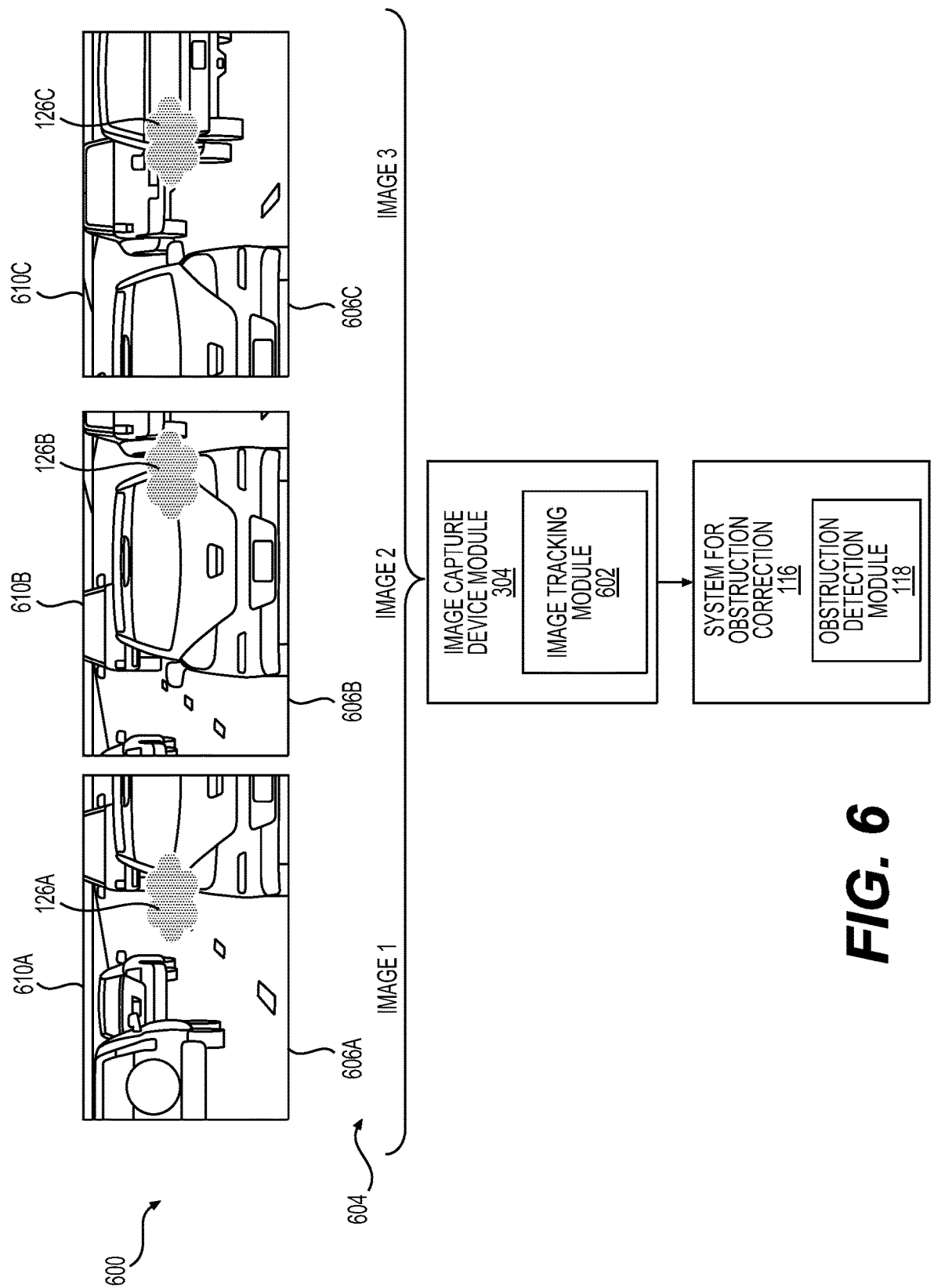
FIG. 6 is an example pictorial flow diagram of an example process for detecting an obstruction on a surface of a sensor using an example image tracking module.

FIG. 6 is an example pictorial flow diagram of an example process 600 for detecting and removing an obstruction from a surface of a sensor using an example image tracking module 602. In the example process 600 shown in FIG. 6, the sensor may include an image capture device, and determining the presence of the obstruction 126 on the surface of the sensor may include receiving signals from the image capture device corresponding a sequence of images indicative of features present in the environment, and tracking features through the sequence of images (e.g. SIFT, SURF, ORB, A-KAZE, HOG, etc.). The image capture device may include, for example, one or more cameras (e.g., RGB-cameras, monochrome cameras, intensity (grey scale) cameras, infrared cameras, ultraviolet cameras, depth cameras, stereo cameras, and the like). In some such examples, determining the presence of the obstruction 126 may include identifying the obstruction by identifying a feature in the sequence of images that fails to move in a manner consistent with other features.

In the example shown in FIG. 6, a sequence 604 of images 606A-606C corresponding to Images 1-3 is schematically depicted. As seen in the images 606A-606C, as, for example, a vehicle, having an image capture device mounted thereon changes lanes, the vehicle 608 closest to the image capture device and the other vehicles in the images 606A-606C move to the left relative to the fields of view 610A-610C, with vehicles and lane divider lines all moving through the images 606A-606C progressively. In contrast, the obstruction 126 remains at the same location in each of the images 606A-606C of the sequence 604. Thus, if a relatively large portion of the features captured in images of an image sequence moves through and out of the image sequence in a consistent manner (e.g., because the sensor is moving through the environment), and another feature does not move relative to the sequence of images, it may be an indication that the non-moving feature is an obstruction on the sensor rather than a feature in the environment. In some examples, such feature calculation and relevant feature motion determinations may be associated with a speed of the vehicle as determined using any number of sensors. Additionally, or alternatively, regions of an image consistently having an optical flow of zero may be associated with an obstruction. In some examples, this detection of the obstruction 126 may be confirmed or discounted, for example, according to other methods described herein. In some examples, tracking may be performed by tracking a feature between two or more different sensors, such that a lost feature may indicate an obstruction.

Figure 7:
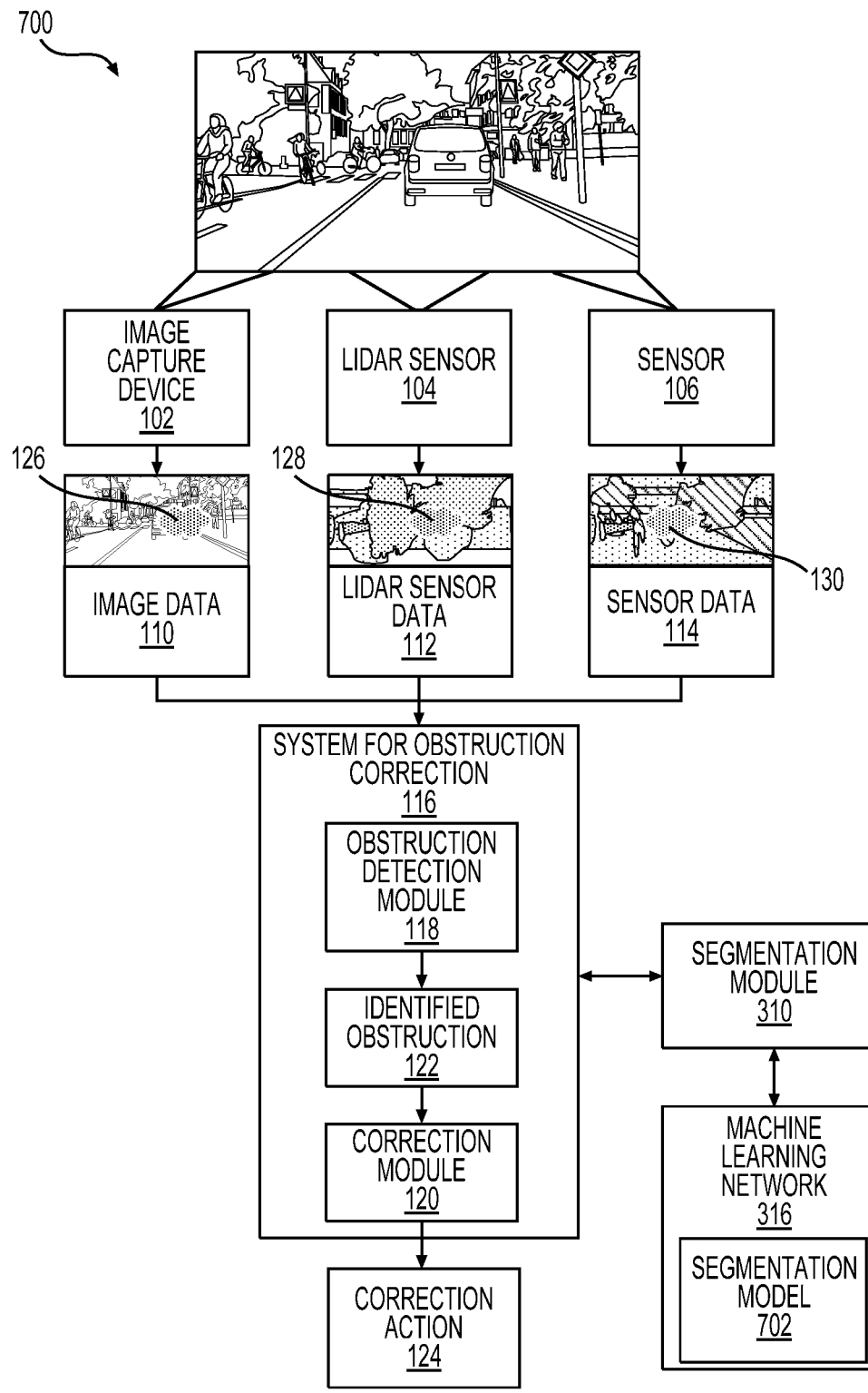
FIG. 7 is an example pictorial flow diagram of an example process for detecting an obstruction on a surface of a sensor using an example segmentation module and machine learning network.

FIG. 7 is an example pictorial flow diagram of an example process 700 for detecting and removing an obstruction from a surface of a sensor using an example segmentation module 310 and machine learning network 312 (e.g., a convolutional neural network (CNN)). For example, the image capture device 102, the LIDAR sensor 104, and/or the sensor 106 may communicate one or more signals indicative of a scene in the environment to the system for obstruction correction 116, and the obstruction detection module 118 may communicate the one or more signals to the segmentation module 310, so that the data may be segmented using the machine learning network 312 (e.g., the image data 110 may be segmented). The same, or similar, algorithms may be used to segment any one or more of the other sensor modalities. In some examples, the machine learning network 312 may execute a segmentation model 702 trained to segment the data and/or classify objects in the data. In some examples, based at least in part on the segmentation, the machine learning network 312 may be configured to determine the presence of an obstruction on the surface of one or more of the image capture device 102, the LIDAR sensor 104, or the sensor 106, for example, by identifying at least one segment in the scene that is stationary relative to the sensor in a manner inconsistent with other segments in the scene. For example, the machine learning network 312 may segment and/or categorize all objects detected in a scene, and the obstruction may be stationary in the scene even though everything else in the scene is in motion relative to the sensors and/or relative to the vehicle. This may be an indication that the stationary object is an obstruction rather than something in the environment. In some examples, this form of detection of an obstruction may be confirmed or discounted, for example, according to other methods described herein.

The machine learning network 312 may include any type of machine learning network described herein. For example, the machine learning network 312 may be a CNN. In some examples, the machine learning network 312 may include more than one machine learning network. As explained herein, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

To produce a valid output, a machine learning network, such as, for example, a CNN, must first learn a set of parameters, or be "trained." Training is accomplished by inputting a dataset into the network, the dataset being associated with expected output values. These expected output values may generally be referred to as "ground truth." For example, a ground truth may include an identification of specific objects in an image, as well as a semantic classification or label associated with the object (e.g., identifying and labeling an object as a car or a building). The accuracy of a network may be based on the amount and/or accuracy of data provided in the training dataset. As a result, an appropriate dataset to train a network to output segmented sensor data would include sensor data having known, or previously determined, segments. In some examples, training datasets may include one or more segmented images representative of real-world scenes correlated with one or more sensor datasets representative of real-world scenes, which may be annotated by hand or via one or more algorithms configured to segment, detect, classify, and/or label objects in the sensor datasets. In some examples, a training dataset may include synthetic (e.g., computer generated) data that include annotated objects or that has been annotated by a computer algorithm. Training can be performed using offline and/or online data.

Loss functions may be used to adjust internal parameters of the network during training. The loss functions are functions of the expected output (or ground truth) values for the dataset and values output by the network. Information contained in loss functions may be sent through the network as back propagations to adjust internal parameters, thereby tuning the network to provide valid outputs. All else being equal, the more data used to train a network, the more reliable the network may be (e.g., in providing accurate segmentations and/or classifications).

One example of such a loss function that may be used to train a network to segment sensor data is the softmax function, though any other function of input data with expected, or ground truth, segmented data is contemplated. Other exemplary loss functions include, but are not limited to, support vector machine (SVM) loss, hinge loss, etc.

In any of the above referenced examples, one sensor modality may inform any other sensor modality. As a non-limiting example, LIDAR sensor data 112 may indicate an object (whether static or dynamic) in the environment proximate to the vehicle as may be determined based on, for example, LIDAR feature tracking, LIDAR segmentation, LIDAR classification, and the like. In such examples, objects determined in the LIDAR sensor data 112 may be used to determine an expected sensor return in the remaining sensor modalities (e.g. in other LIDAR sensors, in image data 110, or sensor data 114). Discrepancies between expected object detections and measurements of the data may indicate an obstruction. Based on the calculated difference (or discrepancy), a type of obstruction may also be determined (e.g., moisture may be associated with different features and/or a blur, a lack of features may be associated with a full obstruction, and the like). It is further contemplated that sensor data from any first subset (including the full set) of sensor data may be compared to any second subset of sensor data to determine the existence of an obstruction.

Figure 8:
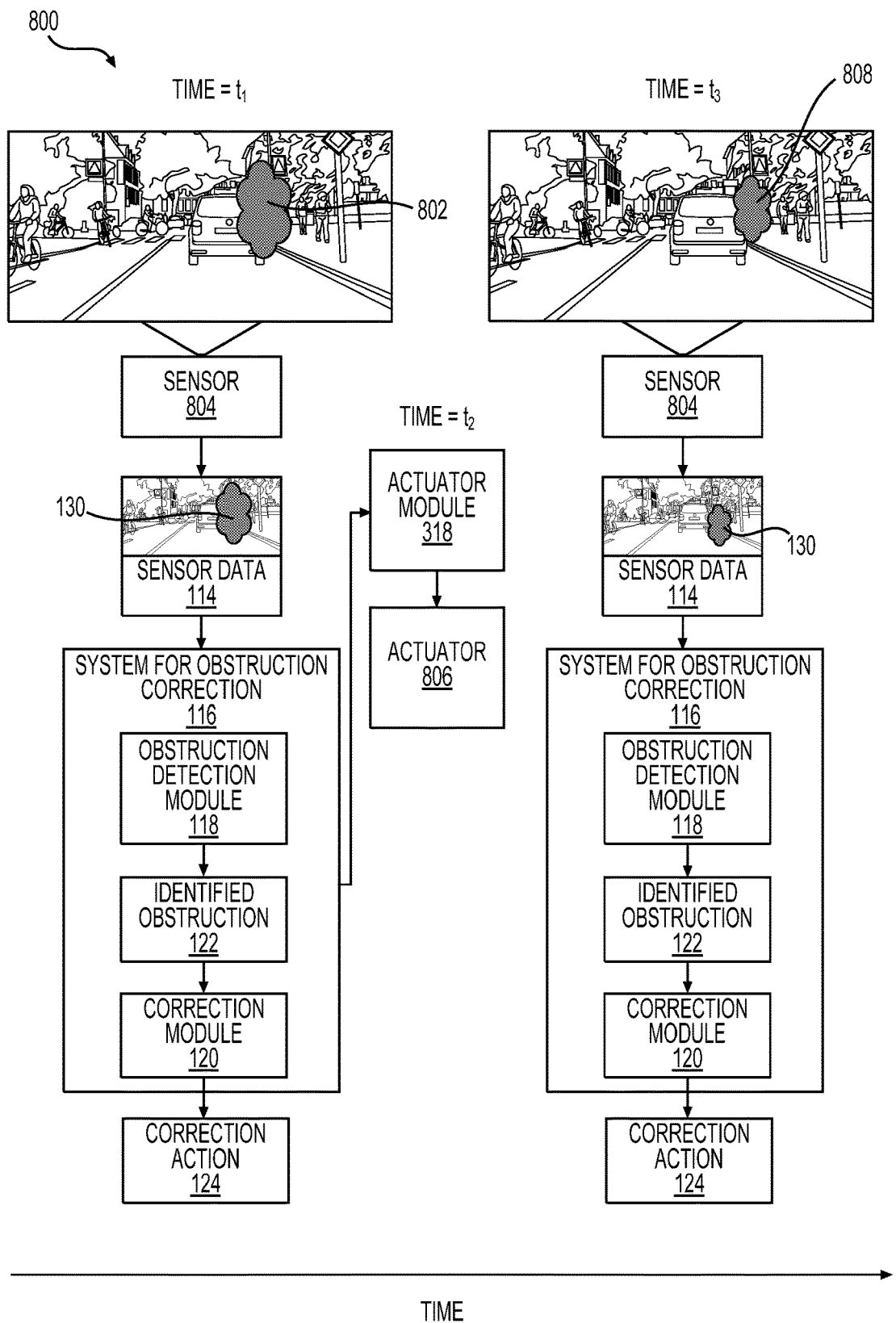
FIG. 8 is an example pictorial flow diagram of an example process for detecting an obstruction on a surface of a sensor using an example actuator module and actuator.
Figure 9:
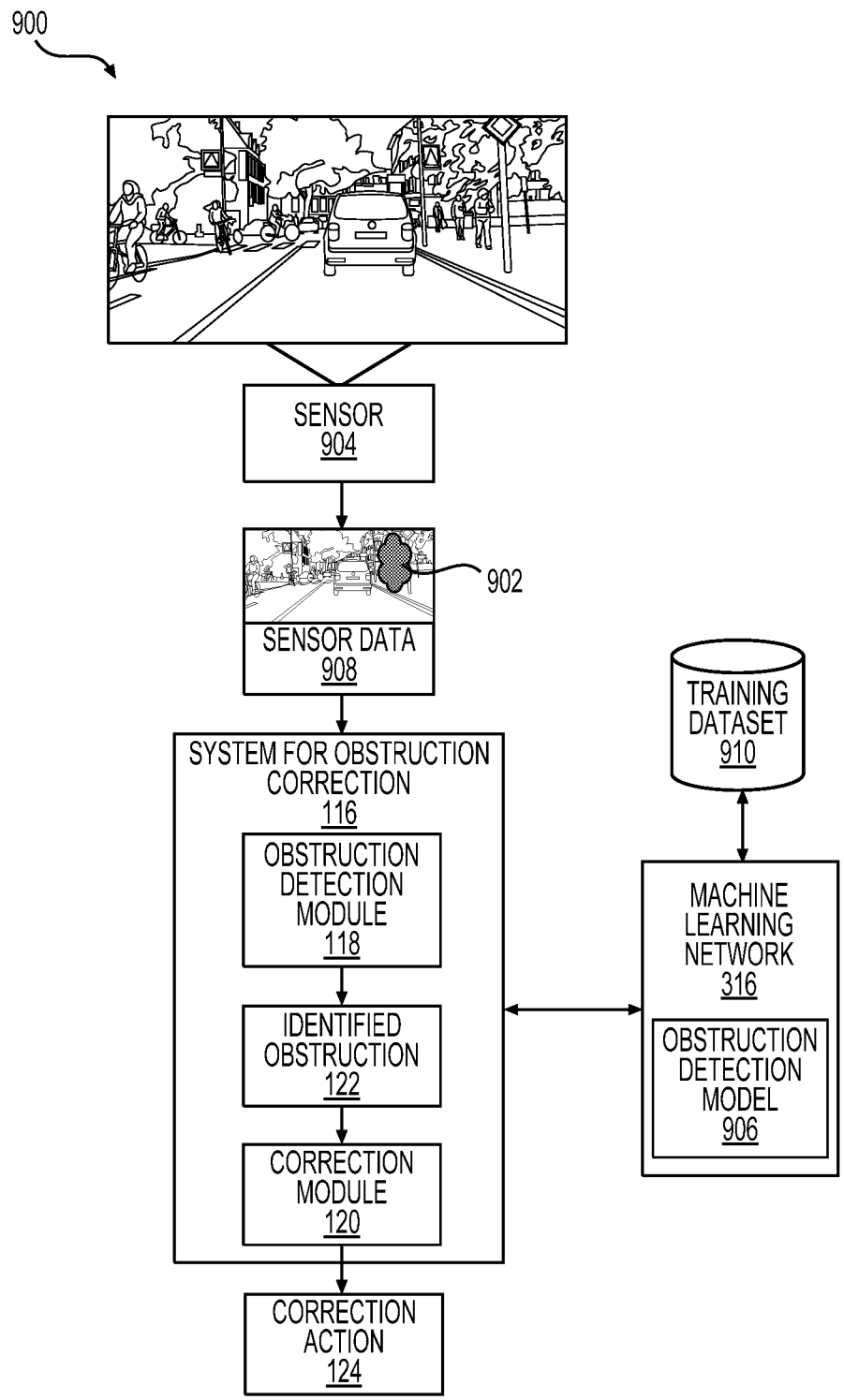
FIG. 9 is an example pictorial flow diagram of an example process for detecting an obstruction on a surface of a sensor using an example machine learning network executing an obstruction detection model trained to detect obstructions.

FIG. 8 is an example pictorial flow diagram of an example process 800 for detecting and removing an obstruction 802 from a surface of a sensor 804 (e.g., an image capture device) using an example actuator module 318 and actuator 806. In the schematic depiction of FIG. 8, time $t_1$ through time $t_3$ is shown in sequence from left-to-right. In this example, the system for obstruction correction 116 at $t_1$ communicates with the actuator module 318, which at $t_2$ causes the actuator 806, which is configured to at least partially remove obstructions from an affected sensor, to actuate. At $t_3$, the obstruction detection module 118 evaluates whether the activation of the actuator 806 has affected the data obtained from the sensor 804, which might be an indication that there was an obstruction on the surface of the sensor 804 that was at least partially removed by the actuator 806. For example, as schematically depicted at time $t_3$, relative to the obstruction 802 at $t_1$ shown, the obstruction 808 at time $t_3$ has become relatively smaller. This is an indication that the obstruction 802 was an obstruction on the sensor 804 rather than a detected object in the environment. The actuator 806 may include one or more of a water jet, an air jet, an ultrasonic cleaner, a wiper, a heater configured to reduce condensation, or an emitter of electromagnetic waves, or any other type of device configured to at least partially remove an obstruction from a sensor. Other types of actuators are contemplated. In some examples, if at $t_3$ the obstruction 808 at least partially remains on the sensor 804, the system for obstruction correction 116 may take further action to mitigate the effects of the obstruction 808 and/or remove more of the obstruction 808, for example, as described herein. In some examples, this form of detection of an obstruction may be confirmed or discounted, for example, according to other methods described herein FIG. 9 is an example pictorial flow diagram of an example process 900 for detecting and removing an obstruction 902 from a surface of a sensor 904 using an example machine learning network 312 executing an obstruction detection model 906 trained to detect obstructions. For example, the system for obstruction correction 116 may communicate sensor data 908 to the machine learning network 312, and the obstruction detection model 906 may, in some examples, be trained to identify an obstruction 902 on the surface of the sensor 904. In some such examples, the machine learning network 312 may be trained to distinguish obstructions from objects in the environment, for example, via one or more training datasets 910 correlating one or more sensor signals with obstructions. In identifying obstructions, confidence levels may be associated with the identification of an obstruction, and the system for obstruction detection 116, in some examples, may be configured to initiate the response when a confidence level associated with the identification exceeds a threshold confidence level. For example, a response such as one or more of those described herein may be used to mitigate or at least partially remove the obstruction 902 from the sensor 904. In some examples, this detection of an obstruction may be confirmed or discounted, for example, according to other methods described herein. Further, in some examples, such a detection model may be trained to output a suggested correction action. As a non-limiting example, such a model may be trained to detect moisture and output an action to wipe the sensor or blow it with air, to detect a full obstruction and output an action to wipe the sensor or blow it with water, etc.

Figure 10:
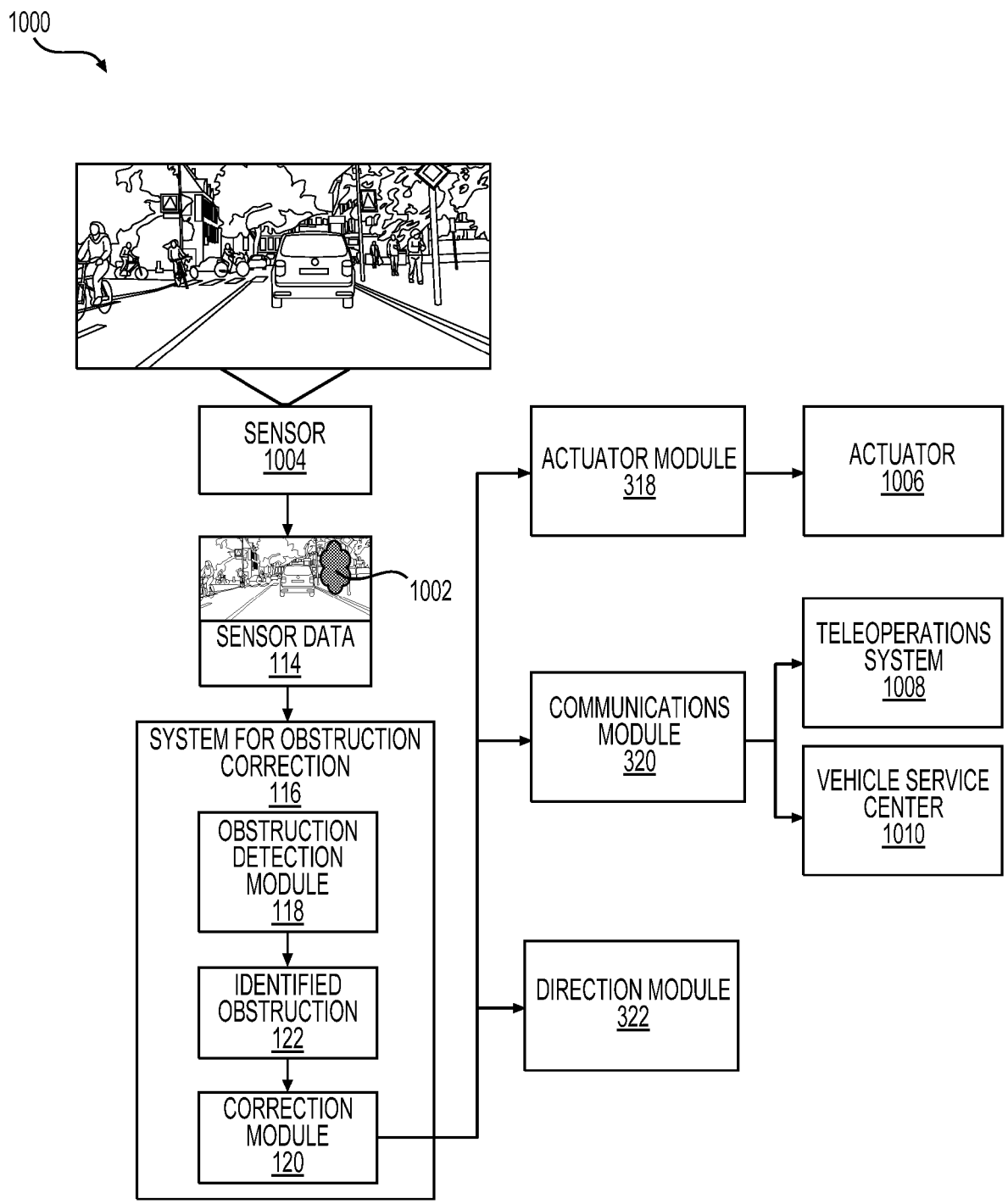
FIG. 10 is an example pictorial flow diagram of an example process for detecting and removing an obstruction from a surface of a sensor including example actions responsive to detecting an obstruction.

FIG. 10 is an example pictorial flow diagram of an example process 1000 for detecting and removing an obstruction 1002 from a surface of a sensor 1004 including example actions responsive to detecting the obstruction 1002. For example, once the obstruction detection module 118 has determined the presence of the obstruction 1002, for example, as described herein, the obstruction detection module 118 communicates with the correction module 120, which in turn, may initiate a response to mitigate the effects of the obstruction 1002 and/or at least partially remove the obstruction from the sensor 1004.

In some examples, initiating the response may include either ignoring the one or more signals from the sensor 1004, for example, until the effects of the obstruction 1002 have been mitigated or the obstruction 1002 has been at least partially removed. For example, the correction module may communicate with a vehicle control module associated with the vehicle, so that the vehicle may respond accordingly. In some examples, portions of data from the sensor 1004 associated with the obstruction 1002 may be ignored. For example, if the obstruction detection module 118 determines that the obstruction 1002 is present on the sensor 1004, the one or more signals may be ignored by the system receiving the one or more signals, such as, for example, a vehicle control module, accordingly. In some examples, only portions of the data determined to be affected by the obstruction 1002 may be ignored, while other portions of the data may be used by other systems associated with the vehicle, such as the vehicle control module.

In some examples, initiating the response may include at least partially removing the obstruction by activating an actuator configured to shrink or remove the obstruction. For example, as shown in FIG. 10, the correction module 120 may communicate with the actuator module 318, which in turn, may activate an actuator 1006, which may be any of one or more of the actuators described herein. For example, the actuator 1006 may include one or more of a water jet, an air jet, an ultrasonic cleaner, a wiper, a heater configured to reduce condensation, or an emitter of electromagnetic waves. Other types of actuators are contemplated.

In some examples, the system for obstruction correction 116 may be coupled to a vehicle (e.g., either physically or via a communications system), and initiating the response may include one or more of initiating communication, for example, via the communications module 320, with a teleoperations system 1008 configured to assist with operation of the vehicle, or initiating notification of a vehicle service center 1010 regarding the obstruction 1002. For example, the vehicle may be configured to operate according to an assisted mode, wherein the teleoperations system 1008, which may be located remotely from the vehicle, may receive one or more signals from the vehicle (e.g., via the communications module 320 and/or a related communications network) relating to its operation. For example, the teleoperations system 1008 may be configured to detect the obstruction 1002 based on the one or more signals received from the vehicle, for example, via a teleoperator and/or one or more of the methods described herein. The teleoperations system 1008 may be configured to send one or more signals to the vehicle causing the vehicle to initiate a response to mitigate or at least partially remove the obstruction, for example, as described herein. In some examples, the vehicle may be configured to notify the service center 1010 of the obstruction 1002. In some such examples, the vehicle may also travel to the service center 1010, where the obstruction 1002 may be mitigated or at least partially removed.

In some examples, initiating the response may include reversing a direction of travel of the vehicle, for example, by communication with the direction module 322. In some examples, the vehicle may be a bi-directional vehicle configured to operate generally with equal performance in either a first direction or a second opposite direction, for example, as described herein. In such examples, the vehicle may have at least similar sensors at both ends of the vehicle, and the direction module 322 may be configured to cause the vehicle to operate in the opposite direction of travel if the obstruction detection module 118 determines that an obstruction 1002 is affecting operation of one or more of its sensors 1004 facing toward, or having a field of view facing, the first direction of travel. This may serve to mitigate the effects of the obstruction 1002 until the obstruction 1002 can be reduced in size or removed from the sensor 1004.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 300 (FIG. 3) is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 300. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 300 may be transmitted to the architecture 300 via transmission media or signals, such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 202 is discussed below.

Figure 11:
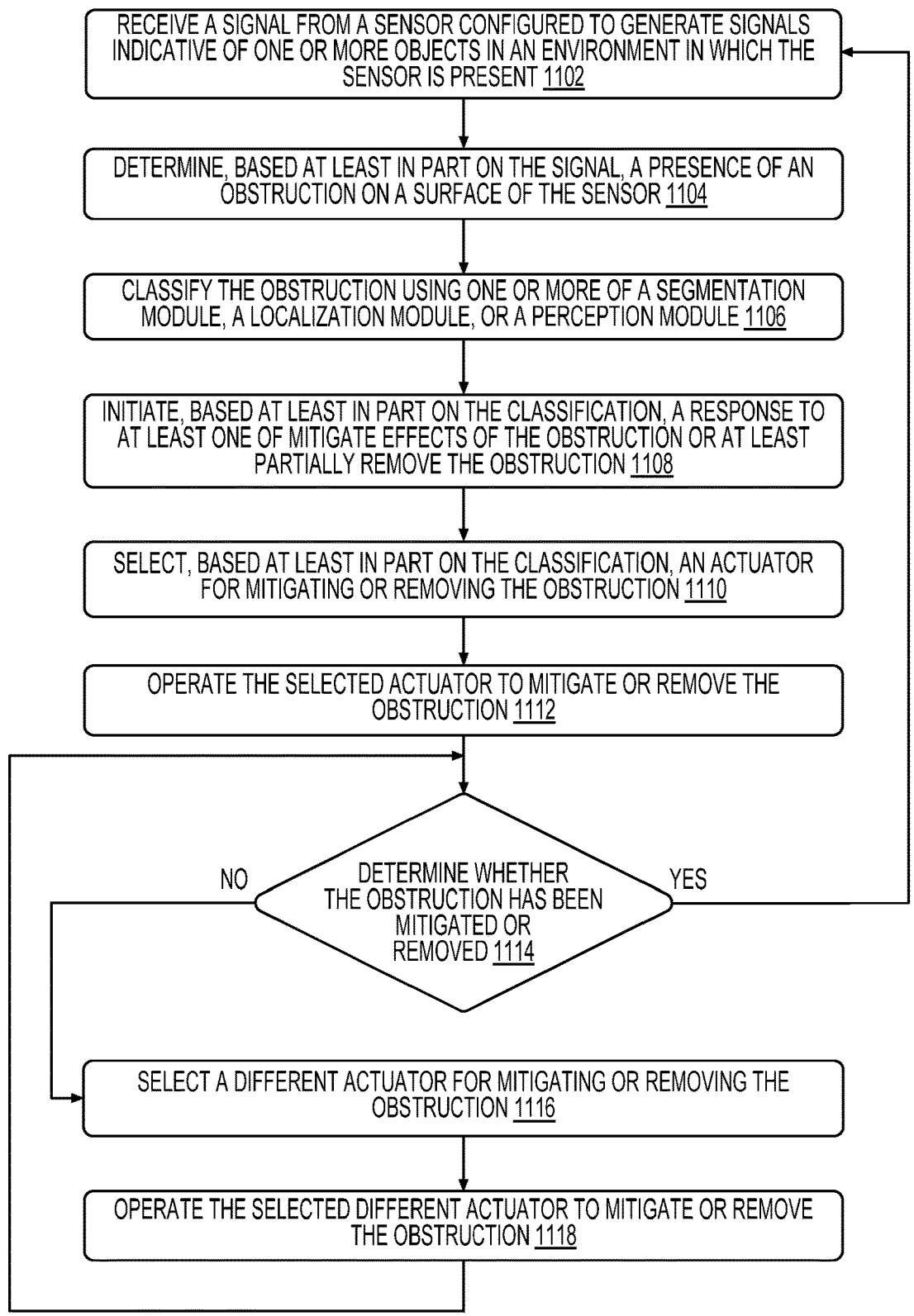
FIG. 11 is a flow diagram of an example process for determining a presence of an obstruction on a surface of a sensor and initiating a response to mitigate effects of the obstruction or at least partially remove the obstruction.

FIG. 11 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 11 is a flow diagram of an example process 1100 for determining a presence of an obstruction on a surface of a sensor and initiating a response to mitigate effects of the obstruction or at least partially remove the obstruction. At 1102, the example process 1100 may include receiving one or more signals from a sensor configured to generate signals indicative of one or more objects detectible in an environment in which the sensor is present. The sensor may include any of the sensor types discussed herein, and the objects may include any objects that may be present in the environment.

At 1104, the example process 1100 may also include determining, based at least in part on the one or more signals, a presence of an obstruction on a surface of the sensor. For example, determining the presence of the obstruction on the surface of the sensor may include one or more of example processes described herein for determining the presence of an obstruction.

In some examples, the process 1100, at 1106, may also include classifying the obstruction, for example, using one or more of a segmentation module, a localization module, or a perception system. In some examples, one or more of the segmentation module or the perception system may use a machine learning network, for example, as described herein, to classify the obstruction.

At 1108, the example process 1100 may include initiating a response, based at least in part on the determination and/or classification, to mitigate effects of the obstruction and/or at least partially remove the obstruction. For example, initiating a response may be performed according to one or more of the example processes described herein for mitigating the effects of the obstruction or at least partially removing the obstruction.

At 1110, in some examples of the process 1100, the process 1100 may include selecting, based at least in part on the classification, an actuator for mitigating or removing the obstruction. For example, if the obstruction is classified as dirt, bird droppings, or bugs, an actuator, such as, for example, one or more of a water jet, an air jet, an ultrasonic cleaner, or a wiper may be selected for actuation to mitigate or remove the obstruction. In some examples, if the obstruction is classified as moisture, such as rain, a wiper may be selected. In some examples, if the obstruction is classified as condensation, a heater and/or air jet may be selected to reduce or remove the condensation. If the obstruction is classified as snow and/or ice, in some examples, the heater and/or air jet may be selected to melt the snow or ice, followed by selection of a wiper to remove the melted snow or ice.

Some examples of the process 1100 may also include, at 1114, determining whether the obstruction has been mitigated or removed. This may be determined, for example, by any of the example methods described herein. If the obstruction has been mitigated, the process 1100 may include continuing to operate the one or more actuators until the obstruction has been substantially (or satisfactorily) removed from the sensor. In some examples of the process 1100, if it is determined that the obstruction has been removed, the process 1100 may return to 1102.

On the other hand, if the obstruction has not been mitigated or removed, the process 1100 at 1116 may select a different actuator for mitigating or removing the obstruction. For example, if the actuator selected at 1110 does not affect the obstruction, it may be an indication that the obstruction has been misclassified and/or that a different actuator should be used. For example, if a water jet was selected at 1110 and operated at 1112, but the obstruction has not been mitigated or removed, a wiper may be selected at 1116.

In some such examples, the process 1100 at 1118 may include operating the selected different actuator to mitigate or remove the obstruction. Following, or during operation, the process 1100 may return to 1114 to determine whether the obstruction has been mitigated or removed. If so, the process 1100 may return to 1102 as noted above. If not, the process 1100 may return to 1116 for selection of another different actuator. In some examples, if the obstruction continues to defy mitigation or removal, the process 1100 may include initiating alternative responses, such as, for example, those noted above with respect to FIG. 10. For example, initiating the response may include either ignoring the one or more signals from the affected sensor. For example, one or more signals from the affected sensor may be ignored by the system receiving the one or more signals, such as, for example, a vehicle control module. In some examples, only portions of the data determined to be affected by the obstruction may be ignored, while other portions of the data may be used by other systems associated with the vehicle, such as the vehicle control module. In some examples, initiating the response may include one or more of initiating communication, for example, via a communications module, with a teleoperations system configured to assist with operation of the vehicle, or initiating notification of a vehicle service center. In some such examples, the vehicle may also travel to the service center where the obstruction may be mitigated or at least partially removed. In some examples, initiating the response may include reversing a direction of travel of the vehicle (e.g., a bi-directional vehicle), for example, as described herein.

Figure 12:
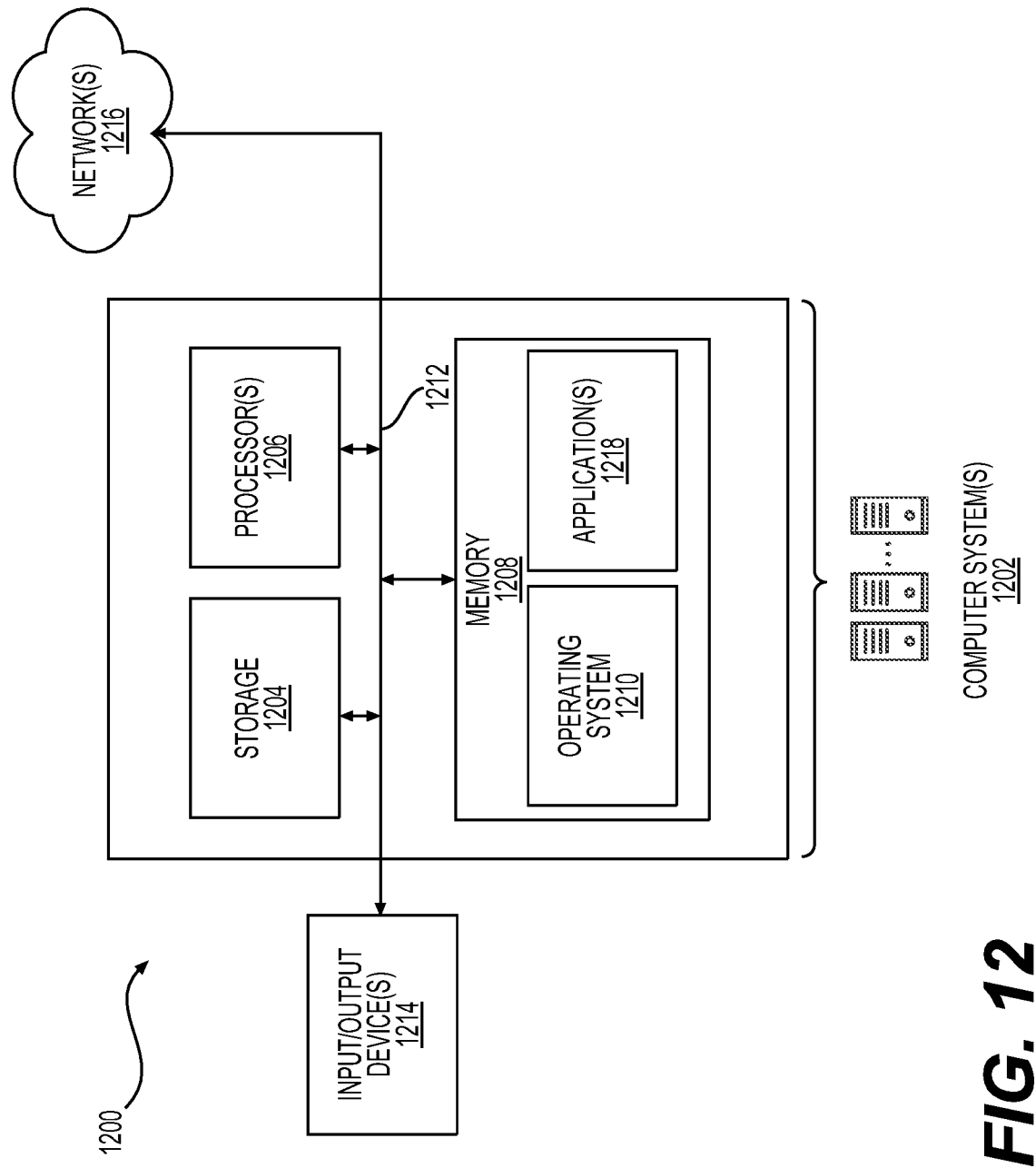
FIG. 12 depicts a block diagram of an example computer architecture for implementing the processes described herein.

FIG. 12 depicts a block diagram of an example computer architecture 1200 for implementing the processes described herein. The example, architecture 1200 includes one or more computer systems 1202 that may include a storage 1204, one or more processor(s) 1206, and a memory 1208 including an operating system 1210. The storage 1204, the processor(s) 1206, the memory 1208, and the operating system 1210 may be communicatively coupled over a communication infrastructure 1212. In some examples, the computer system(s) 1202 may interact with a user, or environment, via input/output (I/O) device(s) 1214, as well as one or more other computing devices over one or more networks 1216, via the communication infrastructure 1212. The operating system 1210 may interact with other components to control one or more applications 1218 in the memory 1208.

In some examples, the computer system(s) 1202 may correspond to the computer system(s) 302 of FIG. 3. The computer system(s) 302 may implement any hardware and/or software to implement the modules 118, 120, 304, 306, 308, 310, 312, 314, 316, 318, 320, and 322 to perform the example processes discussed herein.

The systems and methods described herein may be implemented in software or hardware or any combination thereof. The systems and methods described herein may be implemented using one or more computing devices, which may or may not be physically or logically separate from each other. The methods may be performed by components arranged as either on-premise hardware, on-premise virtual systems, or hosted-private instances. Additionally, various aspects of the methods described herein may be combined or merged into other functions.

A processor or computer system may be configured to particularly perform some or all of the methods described herein. In some examples, the methods may be partially- or fully-automated by one or more computers or processors. The systems and methods described herein (or any part(s) or function(s) thereof) may be implemented using hardware, software, firmware, or a combination thereof and may be implemented in one or more computer systems or other processing systems. In some examples, the illustrated system elements may be combined into a single hardware device or separated into multiple hardware devices. If multiple hardware devices are used, the hardware devices may be physically located proximate to or remotely from each other. The examples of the methods described and illustrated are intended to be illustrative and not limiting. For example, some or all of the steps of the methods may be combined, rearranged, and/or omitted in different examples.

In some examples, the systems and methods described herein may be directed to one or more computer systems capable of carrying out the functionality described herein. Example computing devices may be, but are not limited to, a personal computer (PC) system running any operating system, such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, for example, but not limited to, an iTV, a video on demand system (VOD), and via a digital video recorder (DVR), or other on demand viewing system.

The systems described herein may include one or more processors. The processor(s) may be connected to a communication infrastructure, such as, but not limited to, a communications bus, cross-over bar, or network, etc. The processes and processors need not be located at the same physical locations. In other words, processes may be executed at one or more geographically distant processors, over for example, a LAN or WAN connection. Computing devices may include a display interface that may forward graphics, text, and other data from the communication infrastructure for display on a display unit.

The computer system, in some examples, may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some examples, a machine-accessible medium may refer to any storage device used for storing data accessible by a computer. Examples of a machine-accessible medium may include, but are not limited to, a magnetic hard disk; a floppy disk; an optical disk, at least similar to a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices may include, as non-limiting examples, magnetic disks (including internal hard disks and removable disks), magneto-optical disks, optical disks, read-only memory, random access memory, and/or flash storage. Storage devices suitable for tangibly embodying computer program instructions and data may also include all forms of non-volatile memory, including, for example, semiconductor memory devices, such as EPROM, EEPROM, and flash memory devices; magnetic disks, such as internal hard disks and removable disks; magneto-optical disks; and CD-ROM and DVD-ROM discs. The processor and the memory may be supplemented by, or incorporated in, ASICs (application-specific integrated circuits).

The processing system may be in communication with a computerized data storage system. The data storage system may include a non-relational or relational data store, such as a MySQL™ or other relational database. Other physical and logical database types may be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some examples, the processing system may use object-oriented programming and may store data in objects. In such examples, the processing system may use an object-relational mapper (ORM) to store the data objects in a relational database. The systems and methods described herein may be implemented using any number of physical data models. In some examples, a relational database management system (RDBMS) may be used. In such examples, tables in the RDBMS may include columns that represent coordinates. Data may be stored in tables in the RDBMS. The tables may have pre-defined relationships between them. The tables may also have adjuncts associated with the coordinates.

In some examples, secondary memory may include other similar devices for allowing computer programs or other instructions to be loaded into computer systems. Such devices may include, for example, a removable storage unit and an interface. Examples of such may include a program cartridge and cartridge interface (such as, for example, but not limited to, those found in video game devices), a removable memory chip (such as, for example, but not limited to, an erasable programmable read only memory (EPROM), or programmable read only memory (PROM) and associated socket), and other removable storage units and interfaces, which may allow software and data to be transferred from the removable storage unit to the computer system.

The computing system may also include an input device, such as, but not limited to, a voice input device, such as a microphone, touch screens, gesture recognition devices, such as cameras, other natural user interfaces, a mouse or other pointing device, such as a digitizer, and a keyboard or other data entry device. The computer system may also include output devices, such as, but not limited to, a display and a display interface. The computing system may include input/output (I/O) devices, such as, but not limited to, a communications interface, cable and communications path, etc. These devices may include, but are not limited to, a network interface card and modems. Communications interface(s) may allow software and data to be transferred between a computer system and one or more external devices.

In some examples, the computer system may be operatively coupled to an automotive system. Such an automotive system may be either manually operated, semi-autonomous, or fully autonomous. In such examples, input and output devices may include one or more sensors, such as, image capture devices, LIDAR sensors, and other types of sensors, controllers, microcontrollers, and/or other processors to control automotive functions, such as, but not limited to, acceleration, braking, and steering. Further, communication infrastructure in such examples may also include a Controller Area Network (CAN) bus.

In some examples, the computer system may be operatively coupled to any machine vision-based system. For example, such machine vision-based systems may include, but are not limited to, manually operated, semi-autonomous, or fully autonomous industrial or agricultural robots, household robots, inspection systems, security systems, etc. For example, the examples described herein are not limited to one particular context and may be applicable to any application utilizing machine vision.

Some examples may be practiced in the environment of a computer network or networks. The network may include a private network or a public network (e.g., the Internet), or a combination of both. The network may include hardware, software, or a combination of both.

From a telecommunications-oriented view, the network may be described as a set of hardware nodes interconnected by a communications facility, with one or more processes (hardware, software, or a combination thereof) functioning at each node. The processes may inter-communicate and exchange information with one another via communication pathways between them using interprocess communication pathways. On these pathways, appropriate communications protocols may be used.

An example computer and/or telecommunications network environment may include nodes, which may include hardware, software, or a combination of hardware and software. The nodes may be interconnected via a communications network. Each node may include one or more processes executable by processors incorporated into the nodes. A single process may be run by multiple processors, or multiple processes may be run by a single processor, for example. Additionally, each of the nodes may provide an interface point between the network and the outside world, and may incorporate a collection of sub-networks.

In some examples, the processes may communicate with one another through interprocess communication pathways supporting communication through any communications protocol. The pathways may function in sequence or in parallel, continuously or intermittently. The pathways may use any of the communications standards, protocols or technologies, described herein with respect to a communications network, in addition to standard parallel instruction sets used by many computers.

The nodes may include any entities capable of performing processing functions. Examples of such nodes that may be used with the examples herein may include computers (such as personal computers, workstations, servers, or mainframes), handheld wireless devices and wireline devices (such as personal digital assistants (PDAs), modem cell phones with processing capability, wireless e-mail devices, including but not limited to BlackBerry™ devices), document processing devices (such as scanners, printers, facsimile machines, or multifunction document machines), or complex entities (such as local-area networks or wide-area networks), to which are connected a collection of processors, as described. For example, a node itself may be a wide-area network (WAN), a local-area network (LAN), a private network (such as a Virtual Private Network (VPN)), or a collection of networks.

Communications between the nodes may be made possible by a communications network. A node may be connected either continuously or intermittently with the communications network. As an example, a communications network may be a digital communications infrastructure providing adequate bandwidth and information security.

The communications network may include wireline communications capability, wireless communications capability, or a combination of both, at any frequencies, using any type of standard, protocol, or technology. In addition, in some examples, the communications network may be a private network (e.g., a VPN) or a public network (e.g., the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example, non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP), and user datagram protocol (UDP). Any other known or anticipated wireless or wireline protocols and technologies may be used.

Examples disclosed herein may include apparatuses for performing the operations described herein. An apparatus may be specially constructed for the desired purposes, or it may include a general-purpose device selectively activated or reconfigured by a program stored in the device.

Some examples may be embodied in machine-executable instructions. The instructions may be used to cause a processing device, for example, a general-purpose or special-purpose processor, which is programmed with instructions to perform the steps of the processes described herein. Alternatively, the steps of the described herein may be performed by specific hardware components that contain hardwired logic for performing the steps, or by any combination of programmed computer components and custom hardware components. For example, the systems and processes described herein may be provided as a computer program product, as outlined above. Some examples may include a machine-readable medium having instructions stored thereon. The instructions may be used to program any processor or processors (or other electronic devices) to perform a process or method according to the examples described herein. In addition, some examples may be downloaded and stored on a computer program product. In such examples, the program may be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The processes may be implemented in a computer program product accessible from a computer-usable or computer-readable storage medium that provides program code for use by, or in connection with, a computer or any instruction execution system. A computer-usable or computer-readable storage medium may be any apparatus that is capable of containing or storing the program for use by, or in connection with, the computer or instruction execution system, apparatus, or device.

A data processing system suitable for storing and/or executing the corresponding program code may include at least one processor coupled directly or indirectly to computerized data storage devices, such as memory elements. Input/output (I/O) devices, including, but not limited to, keyboards, displays, pointing devices, etc., may be coupled to the system. Network adapters may also be coupled to the system to enable the data processing system to become coupled to other data processing systems or remote printers or storage devices through intervening private or public networks. To provide for interaction with a user, the features may be implemented on a computer with a display device, such as an LCD (liquid crystal display) or another type of monitor for displaying information to the user, and a keyboard and an input device, such as a mouse or trackball, by which the user may provide input to the computer.

A computer program may be a set of instructions that may be used, directly or indirectly, in a computer. The systems and methods described herein may be implemented using programming languages, such as, for example, CUDA, OpenCL, Flash™, JAVA™ C++, C, C#, Python, Visual Basic™, JavaScript™ PHP, XML, HTML, etc., or a combination of programming languages, including compiled or interpreted languages, and may be deployed in any form, including as a stand-alone program or as a module, component, subroutine, or other unit suitable for use in a computing environment. The software may include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™ iOS™, Unix™/X-Windows™, Linux™, etc. The system may be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device, such as a read-only memory, a random-access memory, both, or any combination of the data storage devices described herein. A processor may include any processing circuitry or control circuitry operative to control the operations and performance of an electronic device.

The systems, modules, and methods described herein may be implemented using any combination of software or hardware elements. The systems, modules, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example system comprising:
one or more processors; and
one or more computer readable storage media communicatively coupled to the one or more processors and storing instructions executable by the one or more processors to:
receive a signal from a sensor indicative of one or more objects detectible in an environment in which the sensor is present;
determine, based at least in part on the signal, a presence of an obstruction on a surface of the sensor; and
initiate a response, based at least in part on the determination, to at least one of mitigate effects of the obstruction or at least partially remove the obstruction.

B. The system of example A, wherein determining the presence of the obstruction on the surface of the sensor comprises comparing the signal to a localization signal of a localization system.

C. The system of example A or example B, wherein the sensor comprises a first sensor configured to generate one or more first signals indicative of one or more objects detectible in an environment in which the first sensor is present, and determining the presence of the obstruction on the surface of the first sensor comprises:
receiving a second signal from a second sensor indicative of one or more objects detectible in the environment; and
comparing the second signal to the first signal to determine a difference between objects detected by the first sensor and objects detected by the second sensor.

D. The system of any one of example A through example C, wherein the sensor comprises a light detection and ranging (LIDAR) sensor, and determining the presence of the obstruction on the surface of the sensor comprises:
receiving a first signal from a light sensor of the LIDAR sensor indicating detection of reflected light from an object stationary relative to the LIDAR sensor;
comparing the first signal from the light sensor to one or more second signals received from one or more neighboring light sensors of the LIDAR sensor; and
determining that the signal from the first light sensor is inconsistent with the one or more second signals.

E. The system of any one of example A through example D, wherein the sensor comprises an image capture device, and determining the presence of the obstruction on the surface of the sensor comprises:

receiving signals from the image capture device corresponding a sequence of images indicative of multiple features present in the environment;

tracking the multiple features through the sequence of images; and identifying the obstruction by identifying a feature in the sequence of images that fails to move in a manner consistent with one or more other features of the multiple features.

F. The system of any one of example A through example E, wherein the signal comprises a plurality of signals indicative of a scene in the environment, and determining the presence of the obstruction on the surface of the sensor comprises segmenting the scene, and identifying at least one segment in the scene that is stationary relative to the sensor in a manner inconsistent with one or more other segments in the scene.

G. The system of any one of example A through example F, wherein the instructions are further executable by the one or more processors to:

activate an actuator configured to clear obstructions from the surface of the sensor; and determining the presence of the obstruction on the surface of the sensor comprises determining that following activation of the actuator, the signal from the sensor is indicative of a reduction in size or elimination of an apparent object detected by the sensor.

H. The system of any one of example A through example G, wherein the instructions are further executable by the one or more processors to:

activate a machine learning network trained to identify an obstruction on the surface of the sensor; and initiate the response based at least in part on a confidence level associated with the identification exceeding a threshold confidence level.

I. The system of any one of example A through example H, wherein initiating the response comprises one of ignoring the signal from the sensor or ignoring portions of data associated with the obstruction.

J. The system of any one of example A through example I, wherein the response comprises at least partially removing the obstruction by activating an actuator comprising one or more of a water jet, an air jet, an ultrasonic cleaner, a wiper, a heater configured to reduce condensation, or an emitter of electromagnetic waves.

K. The system of any one of example A through example J, wherein the system is configured to be coupled to a vehicle, and initiating the response comprises one or more of:

initiating communication with a teleoperations system configured to assist with operation of the vehicle;

initiating notification of a vehicle service center regarding the obstruction; or reversing a direction of travel of the vehicle.

L. An example method comprising:

receiving a signal from a sensor indicative of one or more objects detectible in an environment in which the sensor is present;

determining, based at least in part on the signal, a presence of an obstruction on a surface of the sensor; and initiating a response, based at least in part on the determination, to at least one of mitigate effects of the obstruction or at least partially remove the obstruction.

M. The method of example L, wherein determining the presence of the obstruction on the surface of the sensor comprises comparing the signal to a localization signal of a localization system.

N. The method of example L or example M, wherein the sensor comprises a first sensor configured to generate one or more first signals indicative of one or more objects detectible in an environment in which the first sensor is present, and determining the presence of the obstruction on the surface of the first sensor comprises:

receiving a second signal from a second sensor indicative of one or more objects detectible in the environment; and comparing the second signal to the first signal to determine a difference between objects detected by the first sensor and objects detected by the second sensor.

O. The method of any one of example L through example N, wherein the sensor comprises a light detection and ranging (LIDAR) sensor, and determining the presence of the obstruction on the surface of the sensor comprises:

receiving a first signal from a light sensor of the LIDAR sensor indicating detection of reflected light from an object stationary relative to the LIDAR sensor;

comparing the first signal from the light sensor to one or more second signals received from one or more neighboring light sensors of the LIDAR sensor; and determining that the signal from the first light sensor is inconsistent with the one or more second signals.

P. The method of any one of example L through example O, wherein the sensor comprises an image capture device, and determining the presence of the obstruction on the surface of the sensor comprises:

receiving signals from the image capture device corresponding a sequence of images indicative of multiple features present in the environment;

tracking the multiple features through the sequence of images; and identifying, using computer vision, the obstruction by identifying a feature in the sequence of images that fails to move in a manner consistent with one or more other features of the multiple features.

Q. The method of any one of example L through example P, wherein the signal comprises a plurality of signals indicative of a scene in the environment, and determining the presence of the obstruction on the surface of the sensor comprises segmenting the scene, and identifying at least one segment in the scene that is stationary relative to the sensor in a manner inconsistent with one or more other segments in the scene.

R. The method of any one of example L through example Q, wherein determining the presence of the obstruction on the surface of the sensor comprises:

activating an actuator configured to clear obstructions from the surface of the sensor; and determining that following activation of the actuator, the signal from the sensor is indicative of a reduction in size or elimination of an apparent object detected by the sensor.

S. The method of any one of example L through example R, wherein determining the presence of the obstruction on the surface of the sensor comprises activating a machine learning network trained to identify an obstruction on the surface of the sensor, and the method further comprises initiating the response based at least in part on a confidence level associated with the identification exceeding a threshold confidence level.

T. The method of any one of example L through example S, wherein initiating the response comprises one of ignoring the signal from the sensor or ignoring portions of data associated with the obstruction.

U. The method of any one of example L through example T, wherein initiating the response comprises at least partially removing the obstruction by activating an actuator comprising one or more of a water jet, an air jet, an ultrasonic cleaner, a wiper, a heater configured to reduce condensation, or an emitter of electromagnetic waves.

V. The method of any one of example L through example U, wherein the system is configured to be coupled to a vehicle, and initiating the response comprises one or more of:

initiating communication with a teleoperations system configured to assist with operation of the vehicle;

initiating notification of a vehicle service center regarding the obstruction; or reversing a direction of travel of the vehicle.

W. A computer-readable storage medium having computer-executable instructions stored thereupon which, when executed by a computer, cause the computer to:

receive a receive a signal from a sensor indicative of one or more objects detectible in an environment in which the sensor is present;

determine, based at least in part on the signal, a presence of an obstruction on a surface of the sensor; and initiate a response, based at least in part on the determination, to at least one of mitigate effects of the obstruction or at least partially remove the obstruction.

X. The computer-readable storage medium of example W, wherein determining the presence of the obstruction on the surface of the sensor comprises comparing the signal to a localization signal of a localization system.

Y. The computer-readable storage medium of example W or example X, wherein the sensor comprises a first sensor configured to generate one or more first signals indicative of one or more objects detectible in an environment in which the first sensor is present, and determining the presence of the obstruction on the surface of the first sensor comprises:

receiving a second signal from a second sensor indicative of one or more objects detectible in the environment; and comparing the second signal to the first signal to determine a difference between objects detected by the first sensor and objects detected by the second sensor.

Z. The computer-readable storage medium of any one of example W through example Y, wherein the sensor comprises a light detection and ranging (LIDAR) sensor, and determining the presence of the obstruction on the surface of the sensor comprises:

receiving a first signal from a light sensor of the LIDAR sensor indicating detection of reflected light from an object stationary relative to the LIDAR sensor;

comparing the first signal from the light sensor to one or more second signals received from one or more neighboring light sensors of the LIDAR sensor; and determining that the signal from the first light sensor is inconsistent with the one or more second signals.

AA. The computer-readable storage medium of any one of example W through example Z, wherein the sensor comprises an image capture device, and determining the presence of the obstruction on the surface of the sensor comprises:

receiving signals from the image capture device corresponding a sequence of images indicative of multiple features present in the environment;

tracking the multiple features through the sequence of images; and identifying the obstruction by identifying a feature in the sequence of images that fails to move in a manner consistent with one or more other features of the multiple features.

BB. The computer-readable storage medium of any one of example W through example AA, wherein the signal comprises a plurality of signals indicative of a scene in the environment, and determining the presence of the obstruction on the surface of the sensor comprises segmenting the scene, and identifying at least one segment in the scene that is stationary relative to the sensor in a manner inconsistent with one or more other segments in the scene.

CC. The computer-readable storage medium of any one of example W through example BB, wherein the computer-executable instructions are configured to cause the computer to:

activate an actuator configured to clear obstructions from the surface of the sensor; and determine that following activation of the actuator, the signal from the sensor is indicative of a reduction in size or elimination of an apparent object detected by the sensor.

DD. The computer-readable storage medium of any one of example W through example CC, wherein the computer-executable instructions are configured to cause the computer to:

activate a machine learning network trained to identify an obstruction on the surface of the sensor; and initiate the response based at least in part on a confidence level associated with the identification exceeding a threshold confidence level.

EE. The computer-readable storage medium of any one of example W through example DD, wherein initiating the response comprises one of ignoring the signal from the sensor or ignoring portions of data associated with the obstruction.

FF. The computer-readable storage medium of any one of example W through example EE, wherein initiating the response comprises at least partially removing the obstruction by activating an actuator comprising one or more of a water jet, an air jet, an ultrasonic cleaner, a wiper, a heater configured to reduce condensation, or an emitter of electromagnetic waves.

GG. The computer-readable storage medium of any one of example W through example FF, wherein the computer-readable storage medium is configured to be coupled to a vehicle, and initiating the response comprises one or more of:

initiating communication with a teleoperations system configured to assist with operation of the vehicle;

initiating notification of a vehicle service center regarding the obstruction; or reversing a direction of travel of the vehicle.

What is claimed is:

1. A system comprising:
   one or more processors; and
   one or more computer readable storage media communicatively coupled to the one or more processors and storing instructions, that, when executed, cause the one or more processors to perform operations comprising:
      receiving a signal from a sensor indicative of an environment in which the sensor is present, the signal including a single multi-channel image that includes a time channel;
      performing segmentation on the signal by inputting the single multi-channel image into a machine learned model trained to identify obstructions;
      receiving from the machine learned model an output identifying segmentation information, the segmentation information including a first segment associated with a first object that is a non-obstruction in the environment, and a second segment associated with a second object that is an obstruction on a surface of the sensor;

determining that the segmentation information includes the first segment and the second segment, based at least in part on the first object being in motion relative to the second object;

classifying, based at least in part on the segmentation information, the first object as an object classification type and the obstruction as an obstruction classification type, the obstruction classification type being a substance on the surface of the sensor; and initiating a mitigating response to the obstruction, based at least in part on the obstruction being classified as the obstruction classification type.

2. The system of claim 1, wherein classifying the obstruction as the obstruction classification type comprises comparing the signal to a localization signal of a localization system configured to determine one or more of a position or orientation of the sensor based at least in part on one or more of a global positioning system, an inertial measurement unit, a LIDAR sensor, or an image capture device.

3. The system of claim 1, wherein the signal is a first signal comprising first data associated with the first object, and classifying the obstruction as the obstruction classification type comprises:

receiving a second signal from a second sensor, the second signal comprising second data associated with the first object; and determining a difference between the first data associated with the first object and the second data associated with the first object.

4. The system of claim 1, wherein the system is configured to be coupled to a vehicle, and initiating the mitigating response comprises one or more of:

initiating communication with a teleoperations system configured to assist with operation of the vehicle;

initiating notification of a vehicle service center regarding the obstruction; or reversing a direction of travel of the vehicle.

5. The system of claim 1, wherein initiating the mitigating response further comprises the one or more processors causing the obstruction to be at least partially removed.

6. The system of claim 5, wherein the mitigating response comprises application of at least one of a water jet, an air jet, an ultrasonic cleaner, or a wiper.

7. The system of claim 1, wherein the first object is further classified as the object classification type as a car, a pedestrian, a tree, a building, a road surface, or sky.

8. The system of claim 1, wherein determining that the segmentation information includes the second segment associated with the second object is further based at least in part on the second object being stationary relative to the sensor.

9. The system of claim 1, wherein the segmentation is utilized to partition data representative of the environment into different segments including the first segment and the second segment.

10. The system of claim 1, wherein performing the segmentation comprises:

uniquely identifying objects in an image, the objects including the first object and the second object, and labeling the objects in the image with semantic labels, the labeling including labeling the first object as an external object type and labeling the second object as an obstruction type.

11. A method comprising:

receiving a signal from a sensor configured to generate signals indicative of one or more objects detectible in an environment in which the sensor is present, the signal including a single multi-channel image that includes a time channel;

performing segmentation on the signal by inputting the single multi-channel image into a machine learned model trained to identify obstructions;

receiving from the machine learned model an output identifying segmentation information, the segmentation information including a first segment associated with a first object that is a non-obstruction in the environment, and a second segment associated with a second object that is an obstruction on a surface of the sensor;

determining that the segmentation information includes the first segment, and the second segment, based at least in part on the first object being in motion relative to the second object;

classifying, based at least in part on the segmentation information, the first object as an object classification type and the obstruction as an obstruction classification type; and initiating a mitigating response to the obstruction, based at least in part on the obstruction being classified as the obstruction classification type.

12. The method of claim 11, wherein classifying the obstruction as the obstruction classification type comprises comparing the signal to a localization signal of a localization system configured to determine one or more of a position or orientation of the sensor based at least in part on one or more of a global positioning system, an inertial measurement unit, a LIDAR sensor, or an image capture device.

13. The method of claim 11, wherein classifying the obstruction as the obstruction classification type comprises comparing the signal to a localization signal of a localization system configured to determine one or more of a position or orientation of the sensor based at least in part on one or more of a global positioning system, an inertial measurement unit, a LIDAR sensor, or an image capture device.

14. The method of claim 11, wherein the signal is a first signal comprising first data associated with the first object, and classifying the obstruction as the obstruction classification type comprises:

receiving a second signal from a second sensor, the second signal comprising second data associated with the first object; and determining a difference between the first data associated with the first object and the second data associated with the first object.

15. The method of claim 11, wherein initiating the mitigating response further comprises the one or more processors causing the obstruction to be at least partially removed.

16. The method of claim 11, wherein the mitigating response comprises application of at least one of a water jet, an air jet, an ultrasonic cleaner, or a wiper.

17. A non-transitory computer-readable storage medium having computer-executable instructions stored thereupon which, when executed by a computer, cause the computer to perform operations comprising:

receiving at a perception system a signal from a sensor indicative of one or more objects detectible in an environment in which the sensor is present;

performing segmentation on the signal by inputting, into a machine learned model trained to identify obstructions, i) a first image including a first representation of a first object and a second object at a first time, and ii) a second image including a second representation of the first object and the second object at a second time;

receiving, from the machine learned model and based on the first image and the second image, an output identifying the first segment associated with the first object that is a non-obstruction in the environment, and the second segment associated with the second object that is an obstruction on the surface of the sensor;

determining that the segmentation information includes the first segment, and the second segment, based at least in part on the first object being in motion relative to the second object;

classifying, based at least in part on the segmentation information, the first object as an object classification type and the obstruction as an obstruction classification type; and initiating a mitigating response to the obstruction, based at least in part on the obstruction being classified as the obstruction classification type.

18. The non-transitory computer-readable storage medium of claim 17, the operations further comprising:
initiating a second mitigating response to the obstruction, based at least in part on an indication that the obstruction was misclassified.

19. The non-transitory computer-readable storage medium of claim 17, wherein initiating the mitigating response further comprises the one or more processors causing the obstruction to be at least partially removed.

20. The non-transitory computer-readable storage medium of claim 17, wherein the mitigating response comprises application of at least one of a water jet, an air jet, an ultrasonic cleaner, or a wiper.

* * * * *